(12) United States Patent
Husman et al.

(10) Patent No.: US 11,851,538 B1
(45) Date of Patent: Dec. 26, 2023

(54) PROCESS TO MANUFACTURE CARBON FIBER INTERMEDIATE PRODUCTS IN-LINE WITH CARBON FIBER PRODUCTION

(71) Applicant: University of Tennessee Research Foundation, Knoxville, TN (US)

(72) Inventors: George Ervin Husman, Cape Coral, FL (US); Uday Kumar Vasant Vaidya, Birmingham, AL (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 17/900,580

(22) Filed: Aug. 31, 2022

Related U.S. Application Data

(62) Division of application No. 16/699,362, filed on Nov. 29, 2019, now Pat. No. 11,441,001.

(60) Provisional application No. 62/917,227, filed on Nov. 29, 2018.

(51) Int. Cl.
| | |
|---|---|
| *B29C 35/16* | (2006.01) |
| *C08J 5/04* | (2006.01) |
| *B29C 70/10* | (2006.01) |
| *B29B 15/10* | (2006.01) |
| *C08J 5/24* | (2006.01) |

(52) U.S. Cl.
CPC ............ *C08J 5/042* (2013.01); *B29B 15/105* (2013.01); *B29C 35/16* (2013.01); *B29C 70/10* (2013.01); *C08J 5/243* (2021.05); *C08J 2333/24* (2013.01); *C08J 2363/00* (2013.01); *C08J 2367/00* (2013.01)

(58) Field of Classification Search
CPC ........ C08J 5/042; C08J 5/243; C08J 2333/24; C08J 2363/00; C08J 2367/00; B29B 15/105; B29C 35/16; B29C 70/10
USPC ........................................................ 524/495
See application file for complete search history.

(56) References Cited

U.S. PATENT DOCUMENTS

| | | | |
|---|---|---|---|
| 4,380,483 A | 4/1983 | Kilger | |
| 5,911,932 A * | 6/1999 | Dyksterhouse | ....... B29B 15/122 |
| | | | 264/171.23 |
| 6,524,690 B1 | 2/2003 | Dyksterhouse | |
| 7,297,740 B2 | 11/2007 | Dyksterhouse | |
| 10,017,881 B2 | 7/2018 | Shinmen et al. | |
| 10,308,472 B2 | 6/2019 | Ikeda et al. | |
| 10,316,433 B2 * | 6/2019 | Suzuki | ................ D06M 15/564 |
| 11,441,001 B1 * | 9/2022 | Husman | ................... C08J 5/243 |
| 2004/0105969 A1 | 6/2004 | Huang et al. | |
| 2013/0274413 A1 | 10/2013 | Ozeki et al. | |
| 2013/0295806 A1 | 11/2013 | Imai et al. | |
| 2015/0050485 A1 * | 2/2015 | Wagner | ................... B32B 27/08 |
| | | | 156/64 |
| 2016/0351300 A1 * | 12/2016 | Daniel | ..................... H01B 3/48 |
| 2018/0021983 A1 | 1/2018 | Moser et al. | |

OTHER PUBLICATIONS

Notice of Allowance and Fee(s) Due for U.S. Appl. No. 16/699,362 dated May 5, 2022.
Office Action corresponding to U.S. Appl. No. 16/699,362 dated Oct. 6, 2021.
Radilon A 24 100 NT Product Information Brochure, Racici Group, Radilon Performance Plastics, (Mar. 20, 2018).

* cited by examiner

*Primary Examiner* — Hannah J Pak
(74) *Attorney, Agent, or Firm* — Jenkins, Taylor & Hunt, P.A.

(57) ABSTRACT

A process of preparing carbon fiber reinforced polymer (CFRP) intermediate products is described wherein the carbon fibers are prepared from a carbon fiber precursor and then in-line impregnated with a polymeric resin as part of a continuous process. The process can provide cost savings compared to processes wherein carbon fibers are prepared and then impregnated with polymeric resins in a separate process, thereby making the use of CFRP materials more economically feasible. Also described is a system for preparing carbon fiber from a carbon fiber precursor and impregnating the carbon fiber with polymeric resin to provide CFRP intermediate products, such as continuous tapes or rods or discontinuous flakes or pellets.

17 Claims, 14 Drawing Sheets

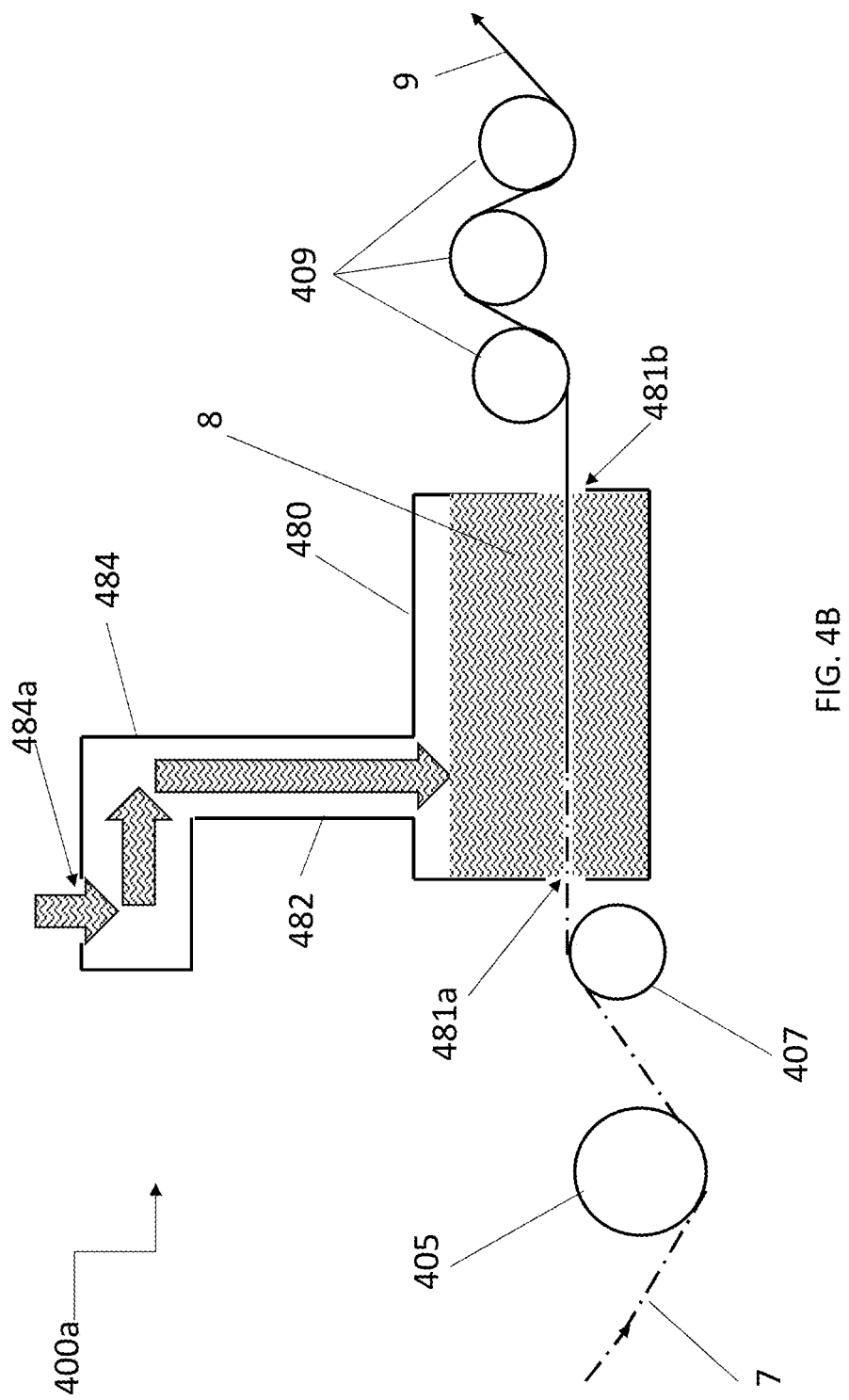

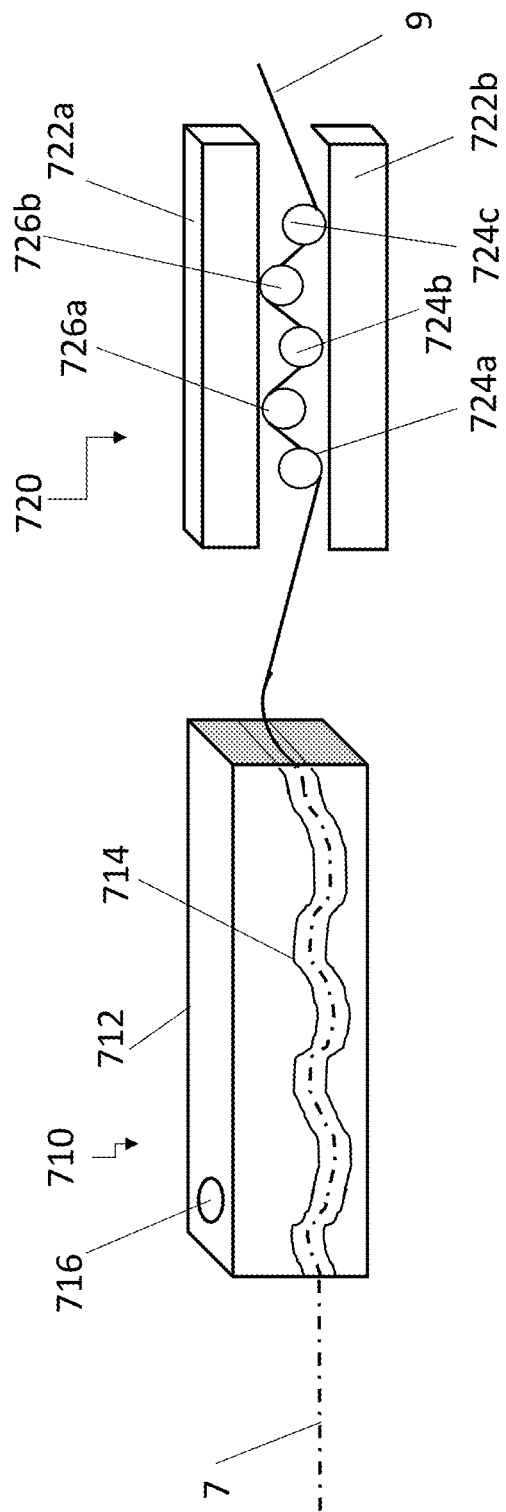
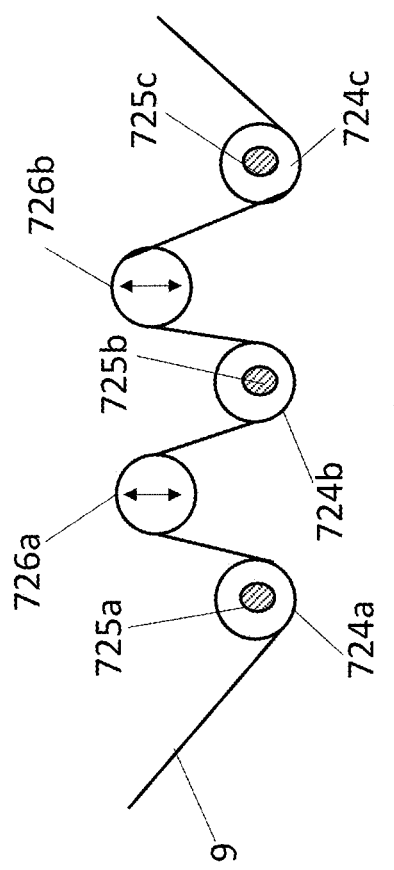
FIG. 7A
FIG. 7B

PROCESS TO MANUFACTURE CARBON FIBER INTERMEDIATE PRODUCTS IN-LINE WITH CARBON FIBER PRODUCTION

RELATED APPLICATIONS

This application is a divisional of U.S. patent application Ser. No. 16/699,362, filed Nov. 29, 2019, which is based on and claims the benefit of U.S. Provisional Patent Application Ser. No. 62/917,227, filed Nov. 29, 2018; the disclosures of which are incorporated herein by reference in their entireties.

TECHNICAL FIELD

The presently disclosed subject matter relates, in some embodiments, to the impregnation of carbon fiber with thermoplastic and/or thermosetting polymer resin as part of a manufacturing process for preparing carbon fiber from a carbon fiber precursor, thereby also producing carbon fiber intermediate products, such as continuous tapes or rods and discontinuous flakes or pellets and other similar or derivative products. The presently disclosed subject matter further relates to systems for in-line preparation of carbon fiber intermediates as part of a system for producing carbon fiber from a carbon fiber precursor.

ABBREVIATIONS

| | | |
|---|---|---|
| % | = | percentage |
| °C. | = | degrees Celsius |
| μm | = | micrometer |
| CFRP | = | carbon fiber-reinforced polymer |
| ft | = | feet |
| GPa | = | gigapascal |
| MFI | = | melt flow index |
| MFR | = | melt flow rate |
| min | = | minutes |
| mm | = | millimeter |
| MPa | = | megapascal |
| PA6 | = | polyamide 6 |
| PAN | = | poly(acrylonitrile) |
| PP | = | polypropylene |
| psi | = | pounds per square inch |
| SEM | = | scanning electron microscopy |
| wt % | = | weight percent |

BACKGROUND

Carbon fiber is used in fiber-reinforced polymer composite materials in a wide array of consumer, industrial, and military applications. Advantages of carbon fiber for use in these applications include its high strength, high stiffness, and light weight or low density. Unfortunately, carbon fiber is relatively expensive with respect to other commonly used structural materials, such as steel and aluminum, limiting its use in many applications.

In many applications of carbon fiber-reinforced polymer (CFRP) composites, the carbon fiber and polymer, whether thermoplastic or thermosetting polymer, are combined using various processes to manufacture carbon fiber intermediate, value-added products that are then used in subsequent CFRP composite product manufacturing. The production of these carbon fiber intermediate, value-added products, such as carbon fiber prepreg tapes and carbon fiber compounded thermoplastic pellets, can add substantial costs, further limiting use of carbon fiber in many applications. For example, in many cases, the cost of these carbon fiber intermediate products are more than two times the cost of the raw materials, i.e., the carbon fiber and polymer, used to produce them. These additive costs are a reason that many product manufacturers do not take advantage of the higher performance properties of CFRP composites and instead use lower cost, lower performance materials.

Accordingly, there is an ongoing need for processes and systems that can produce carbon fiber intermediates, particularly those that can provide the intermediates at lower cost.

SUMMARY

In some embodiments, the presently disclosed subject matter provides a process for preparing a carbon fiber reinforced polymer (CFRP) intermediate product, wherein the CFRP intermediate product comprises carbon fiber and a thermoplastic or thermosetting polymeric matrix, the method comprising: forming carbon fiber from a carbon fiber precursor and in-line impregnating the carbon fiber with a polymeric resin, thereby providing a CFRP intermediate product.

In some embodiments, the presently disclosed subject matter provides a process for preparing a CFRP intermediate product, wherein the CFRP intermediate product comprises carbon fiber and a thermoplastic or thermosetting polymeric matrix, the process comprising: (a) providing a carbon fiber precursor; (b) treating the carbon fiber precursor to form carbon fiber; (c) surface treating the carbon fiber, wherein the surface treating comprises washing and/or surface oxidizing and/or surface etching the carbon fiber; (d) impregnating the carbon fiber with a polymeric resin corresponding to the thermoplastic or thermosetting polymeric matrix of the CFRP intermediate product, thereby providing impregnated carbon fiber; (e) cooling the impregnated carbon fiber to provide a cooled, impregnated carbon fiber having a desired geometry; and (f) processing the cooled, impregnated carbon fiber to provide the CFRP intermediate product, wherein steps (c)-(f) are performed in a continuous process at a single processing speed.

In some embodiments, the carbon fiber precursor is selected from the group comprising poly(acrylonitrile) (PAN) fiber, rayon fiber, cellulose fiber, and pitch fiber. In some embodiments, the carbon fiber precursor is PAN fiber and wherein step (b) comprises: (b1) oxidizing PAN fiber to provide oxidized and/or stabilized PAN fiber; and (b2) carbonizing the oxidized and/or stabilized PAN fiber. In some embodiments, the carbon fiber comprises one or more carbon fiber tows, wherein each carbon fiber tow comprises between about 3,000 and about 50,000 carbon fiber filaments.

In some embodiments, the process further comprises contacting the carbon fiber with one or more sizing agents after step (c) and prior to step (d). In some embodiments, the process further comprises drying the carbon fiber prior to step (d).

In some embodiments, the process further comprises heating the carbon fiber to a melt temperature of the polymeric resin corresponding to the thermoplastic or thermosetting polymeric matrix of the CFRP intermediate product prior to step (d). In some embodiments, the heating comprises pulling the carbon fiber over a heated, polished bar or through an oven.

In some embodiments, step (d) comprises pulling the carbon fiber through one or more impregnation dies and injecting or extruding the polymeric resin into the one or more impregnation dies. In some embodiments, the carbon fiber comprises at least two carbon fiber tows and each of the at least two carbon fiber tows is pulled through a separate impregnation die. In some embodiments, the carbon fiber comprises at least two carbon fiber tows and two or more carbon fiber tows are pulled through the same impregnation die.

In some embodiments, the one or more impregnation dies are heated to a melt temperature of the polymeric resin. In some embodiments, the polymeric resin comprises a thermoplastic polymer selected from the group comprising a polyolefin, a polyamide, a polyimide, and a polyurethane. In some embodiments, the polymeric resin comprises a thermosetting polymer selected from the group comprising an epoxy, a polyimide, and a polyester.

In some embodiments, the cooling is performed while maintaining the impregnated carbon fiber in a tape or ribbon geometry. In some embodiments, the cooling is performed by pulling the impregnated carbon fiber over and under a series of at least two free turning cylinders.

In some embodiments, the cooling is performed while shaping the impregnated carbon fiber into a rod-shaped geometry having a circular or other cross-sectional shape. In some embodiments, the shaping is performed by pulling the impregnated carbon fiber through a die having an outlet with a circular or other shaped outlet.

In some embodiments, the cooled, impregnated carbon fiber is pulled through a puller device prior to step (f) to maintain desired speed and/or tension and/or to feed the cooled, impregnated carbon fiber into a chopper or a pelletizer or onto a winder. In some embodiments, the CFRP intermediate product comprises between about 10 weight % carbon fiber and about 70 weight % carbon fiber.

In some embodiments, the presently disclosed subject matter provides a system for preparing a CFRP intermediate product from a carbon fiber precursor, wherein the CFRP intermediate product comprises carbon fiber and a thermoplastic or thermosetting polymeric matrix, the system comprising: (i) a carbon fiber precursor feed roll; (ii) a carbonization processing stage comprising one or more ovens and/or furnaces, positioned to receive carbon fiber precursor fiber from the carbon fiber precursor feed roll and wherein the carbon fiber precursor fiber is carbonized to form carbon fiber; (iii) a surface treatment stage, comprising a bath or other treatment chamber, positioned to receive carbon fiber from the carbonization processing stage, and wherein carbon fiber is cleaned and/or oxidized and/or etched; (iv) one or more impregnation dies for impregnating the carbon fiber with a polymer resin corresponding to the thermoplastic or thermosetting polymeric matrix of the CFRP intermediate product, wherein the one or more impregnation dies are positioned to receive the carbon fiber after the surface treatment stage; (v) a cooling stage, positioned to receive impregnated carbon fiber after the impregnated carbon fiber exits the one or more impregnation dies, and wherein the impregnated carbon fiber is cooled; and (vi) a product processing stage, positioned to receive cooled, impregnated carbon fiber after it exits the cooling stage and wherein the cooled, impregnated carbon fiber is processed into a desired form of the CFRP intermediate product.

In some embodiments, carbonization processing stage (ii) comprises (iia) an oxidation oven, wherein, during use, the oxidation oven has an internal temperature of between about 180 degrees Celsius (° C.) and about 400° C. and an oxidizing atmosphere, and (iib) one or more carbonization furnaces, wherein, during use, each carbonization furnace is heated to a temperature of between about 1000° C. and about 3000° C. In some embodiments, the oxidizing atmosphere comprises oxygen or nitrogen dioxide.

In some embodiments, surface treatment stage (iii) comprises a bath containing an electrolyte solution. In some embodiments, the system further comprises a sizing bath comprising a bath comprising a solution or emulsion of one or more sizing agent, for applying one or more sizing agent to carbon fiber, wherein the sizing bath is positioned between the surface treatment stage (iii) and the one or more impregnation dies (iv). In some embodiments, the system further comprises a drying stage comprising a drying oven through which carbon fiber can be pulled or a heated polished bar over which carbon fiber can be pulled, wherein the drying stage is positioned between surface treatment stage (iii) and the one or more impregnation dies (iv).

In some embodiments, the system further comprises a heating stage for heating the carbon fiber to a temperature corresponding to a melt temperature of the polymer resin corresponding to the thermoplastic or thermosetting polymeric matrix of the CFRP intermediate product, positioned between surface treatment stage (iii) and the one or more impregnation dies (iv). In some embodiments, the heating stage comprises one or more heated pins, wherein each of said one or more heated pins is located just prior to an inlet of one of the one or more impregnation dies in a direction of fiber movement in the system. In some embodiments, the system further comprises a spreader bar to spread carbon fiber tows prior to entry into the one or more impregnation dies (iv). In some embodiments, each of the one or more impregnation dies further comprises a polymer resin feed tube or a polymer extruder. In some embodiments, the system further comprises one or more tensioning roll.

In some embodiments, cooling stage (v) comprises a shaping die for forming a rod-shaped material from impregnated carbon fiber. In some embodiments, cooling stage (v) comprises a series of at least two free-turning rollers through which impregnated carbon fiber can be pulled. In some embodiments, cooling stage (v) comprises one or more jet for directing cooled air or cooled water toward an impregnated carbon fiber after an exit of one of the one or more impregnation dies. In some embodiments, cooling stage (v) comprises a chamber through which impregnated carbon fiber can be pulled, wherein the chamber comprises an inlet for cooled air, an inlet for impregnated carbon fiber, and an outlet for cooled, impregnated carbon fiber.

In some embodiments, the system further comprises a puller, positioned between cooling stage (v) and product processing stage (vi) through which cooled, impregnated carbon fiber is pulled after it exits cooling stage (v). In some embodiments, product processing stage (vi) comprises a winder. In some embodiments, product processing stage (vi) comprises a chopper and/or a pelletizer.

Accordingly, it is an object of the presently disclosed subject matter to provide in-line processes of producing carbon fiber intermediate products as part of a carbon fiber production process and to provide related systems.

An object of the presently disclosed subject matter having been stated hereinabove, and which is achieved in whole or in part by the presently disclosed subject matter, other objects will become evident as the description proceeds herein below.

BRIEF DESCRIPTION OF THE DRAWINGS

FIG. 4B is a schematic diagram showing an internal side view of the impregnation components shown in FIG. 4A.

FIG. 7A is a schematic drawing of a set of two dies, a first impregnation die and a second five pin exit die, for impregnation of carbon fiber as part of an embodiment of a system of the presently disclosed subject matter.

FIG. 7B is a schematic drawing showing a detailed view of the pins in the five pin exit die shown in FIG. 7A.

DETAILED DESCRIPTION

Figure 1:
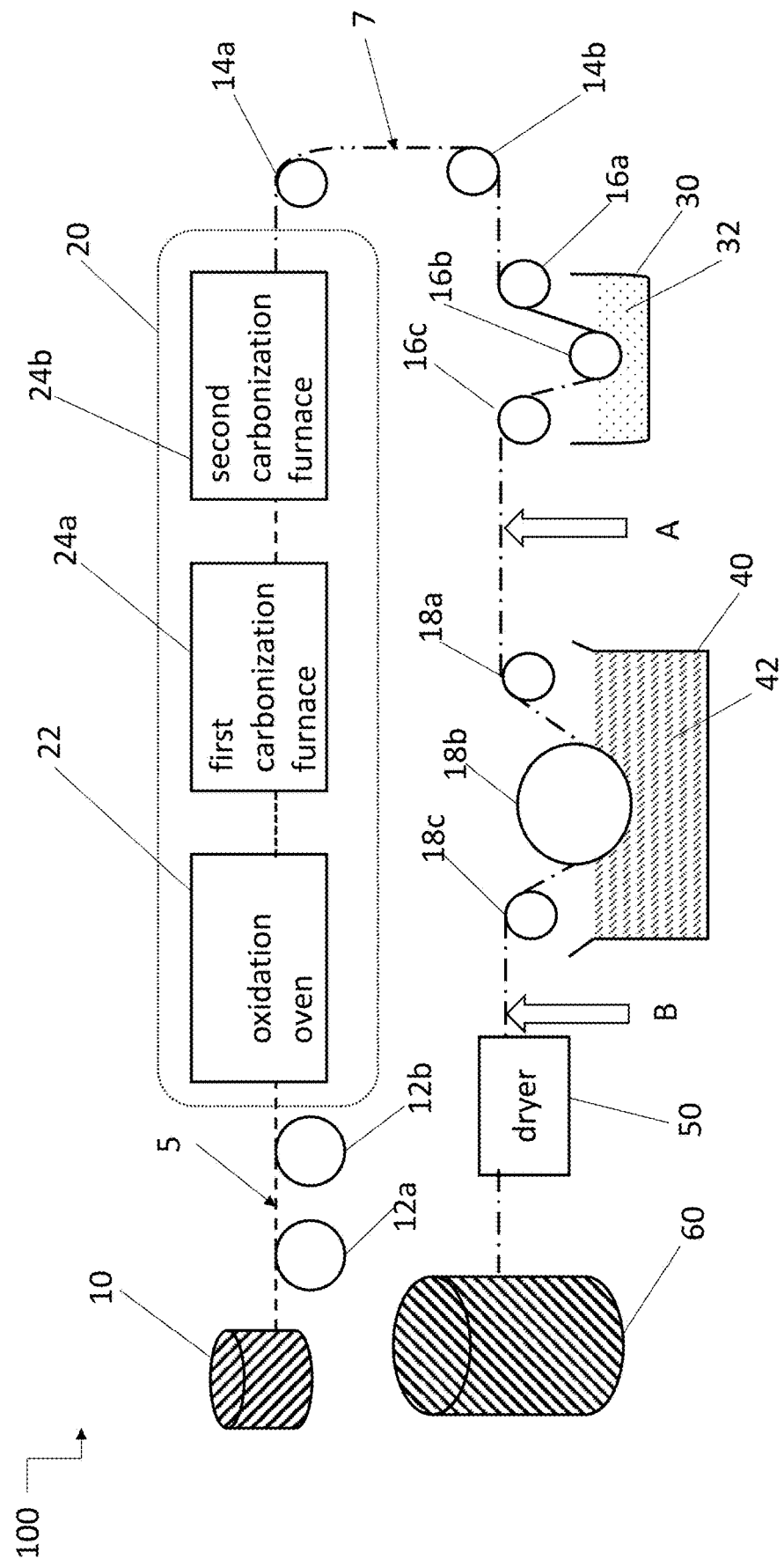
FIG. 1 is a schematic diagram showing a traditional system for carbon fiber manufacturing that converts polyacrylonitrile (PAN) fiber into carbon fiber. Arrows A and B point to locations in the system where components for performing in-line polymer impregnation of the carbon fiber can be introduced according to embodiments of the presently disclosed subject matter.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, weight, concentration, volume, strength, speed, length, width, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4).

As used herein, a "monomer" refers to a non-polymeric molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

As used herein the terms "polymer", "polymeric" and "polymeric matrix" refer to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units. A "copolymer" refers to a polymer derived from more than one species of monomer.

The term "thermoplastic" can refer to a polymer that softens and/or can be molded above a certain temperature, but which is solid below that temperature. Thermoplastic polymers include, but are not limited to, ethylene vinyl acetate copolymers (EVA), polyolefins (e.g., polypropylene (PP)), polyamides, some polyesters (e.g., polybutylene terephthalate (PBT)), styrene block copolymers (SBCs), polycarbonates, silicone rubbers, fluoropolymers, thermoplastic elastomers, polypyrrole, polycaprolactone, polyoxymethylene (POM), and mixtures and/or combinations thereof.

The terms "thermoset" and "thermosetting" refer to a polymer that is irreversibly solidified when polymer precursors (e.g., monomers and/or oligomers, which can also be referred to as "resins" or "pre-polymers") react with one another when exposed to heat, suitable radiation (e.g., visible or ultraviolet light), and/or suitable chemical conditions (e.g., the addition of a chemical polymerization initiator or catalyst (e.g. a peroxide) and/or exposure to suitable pH conditions (such as brought about by the addition of an acid or base)). Thermoset polymers include, but are not limited to, epoxys, polyesters, vinyl esters, phenol formaldehyde systems (e.g., Bakelite), polyurethanes, polyurea/polyurethane hybrids, cyanoacrylates, acrylic polymers (e.g., methacrylates), and mixtures and/or combinations thereof.

The term "resin" when used with regard to a thermosetting polymer can refer to a mixture of the polymer precursors that can be further polymerized and/or crosslinked during curing. The term "resin" can also be used herein to refer to monomers, oligomers, polymers and/or mixtures thereof that can be polymerized or further polymerized to form a thermoplastic polymer.

The terms "roving" and "tow" as used herein refer to a bundle of filaments, often containing thousands or tens of thousands of individual filaments. For example, in some embodiments, the tows referred to herein can comprise between about 3,000 and about 50,000 individual filaments. In some embodiments, the tow can include more than 50,000 filaments. The terms "fiber bundle", "fiber roving" and "fiber tow" can be used interchangeably herein. In some embodiments, the carbon fiber described herein can comprise a plurality of tows, wherein each tow has a uniform cross-sectional dimension and/or the same approximate number of filaments.

II. General Considerations

The production of carbon fibers and carbon fiber intermediates (e.g., wherein carbon fiber tows or rovings are wet out with melted polymeric resin and then cooled to under the melt temperature of the resin and formed into tapes, rods, pellets or flakes) has traditionally been conducted by separate manufacturers. One reason behind this traditional separation of primary and secondary processes is the specialization of equipment and techniques related to each process, a factor that is exacerbated by the use of propriety equipment and trade secret process variations in the carbon fiber production industry, where there is often market pressure to provide carbon fiber that can be differentiated from competitor's carbon fiber via one or more carbon fiber property and/or by cost. In addition, to reduce the costs of preparing carbon fiber intermediates, carbon fiber intermediate producers generally attempt to increase production line speed as high as possible to increase turnover. For example, carbon fiber intermediate production lines can be run at speeds as high as about 30 to 40 feet per minute. In contrast, the speed of carbon fiber production lines is limited by the chemical processes involved to between about 10 and about 15 feet per minute at most. Therefore, carbon fiber production and carbon fiber intermediate production have generally been considered incompatible.

However, described herein are methods and systems of producing carbon fiber intermediates in-line with a carbon fiber production process. The systems can be adapted from existing carbon fiber production lines with little additional space or capital costs involved. Further, the preparation of the carbon fiber intermediates can be performed at the same line speed as the final steps in the production of the carbon fibers, resulting in a seamless process that can avoid the additional costs associated with the current separation of carbon fiber production and carbon fiber intermediate production, e.g., by reducing material handling, processing, labor, and other manufacturing costs.

More particularly, carbon fiber can be produced from a variety of carbon fiber precursors, including both synthetic and natural fibers, such as, but not limited to poly(acrylonitrile) (PAN) fibers, rayon fibers, cellulose fibers or pitch fibers (i.e., petroleum pitch, such as mesoporous petroleum pitch). The majority (i.e., about 90%) of carbon fiber is produced from PAN. Generally, the carbon fiber production process involves heating the precursor fibers to drive off non-carbon atoms to form crystalline carbon filaments. This is also referred to as "carbonization." In some embodiments, the production process can also include a pre-carbonization step of stretching, orienting, oxidizing and/or stabilizing the precursor fibers and/or a post-carbonization step of orienting the carbonized fibers. As noted above, while the carbon fiber industry can make use of propriety equipment and trade secret process variations, some methods of producing carbon fiber have been described, for example, in U.S. Pat. Nos. 10,017,881; 10,308,472; and 10,316,433; and most manufacturers use generally similar equipment and processes.

A typical process for preparing carbon fiber from PAN fibers can include an oxidation stage (which can also be referred to as a "stabilization" stage), in which the PAN fibers are fed under tension into an oven into which heated air (or another gas that provides an oxidizing atmosphere) is also fed. The temperature of the oxidation oven can be between about 200° C. and about 300° C. (e.g., between about 220° C. and about 285° C.). During the oxidation/stabilization process, oxygen molecules from the air (or other oxidizing atmosphere gas) combine with the PAN fibers and the PAN structure rearranges. The oxidized PAN fiber can then have a ladder-like aromatic molecular structure and is ready for carbonization treatment.

Continuing with PAN as a particular example, carbonization is performed in an inert (oxygen-free) atmosphere inside one or more specially designed furnaces. In some embodiments, the oxidized PAN fiber can be passed through a furnace heated to between about 700° C. and about 1650° C. while being exposed to an inert gas (e.g., nitrogen or argon). Carbonization results in the crystallization of carbon molecules and consequently produces a finished carbon fiber that has more than 90 percent carbon content. In some embodiments, the carbonized fiber is then passed through a second furnace heated to a higher temperature (e.g., between about 2500° C. and about 3000° C.). This step can be referred to as "graphitization." In some embodiments, the oxidized PAN fiber is passed through a pre-carbonization furnace prior to a first carbonization furnace, where the pre-carbonization furnace subjects the fiber to temperature of between about 300° C. and about 900° C.

To improve adhesion for the carbon fiber to polymeric resins, the carbon fiber can be surface treated, e.g., to clean the surface of the carbon fiber of any debris or scale remaining after carbonization and/or to etch the surface of the carbon fiber. In some embodiments, the surface treatment can also oxidize the surface of the carbon fiber or otherwise add a small percentage of reactive chemical functional groups to the surface of the carbon fiber to increase interaction of the carbon fiber with polymer. For example, the surface treatment can comprise pulling the carbonized fiber through an electrolytic bath containing an electrolyte, such as ammonium bicarbonate or sodium hypochlorite. The chemicals of the electrolytic bath etch or roughen the surface of the fiber, thereby increasing the surface area available for interfacial fiber/matrix bonding and adding reactive chemical groups.

The carbon fiber can be subjected to sizing, if desired, where a size coating, e.g. a small amount (e.g., about 1 weight %) of an epoxy-based coating or other coating compatible with a particular polymer resin of interest to be used in later CFRP composite manufacture, is applied onto the fiber. Sizing is typically carried out by passing the fiber through a size bath containing a liquid coating material. Sizing protects the carbon fiber during handling and processing into intermediate forms, such as dry fabric and prepreg. Sizing also holds filaments together in individual tows to reduce fuzz, improve processability and increase interfacial shear strength between the fiber and the matrix resin. Following the optional sizing step, the coated carbon fiber is usually dried (e.g., to remove any water or other volatile material from the sizing or surface treatment) and then wound onto a bobbin and sold to other manufacturers for production of carbon fiber intermediates separately.

However, according to the processes and systems of the presently disclosed subject matter, a carbon fiber process and/or manufacturing line can be altered for the in-line production of carbon fiber intermediates. FIG. 1, for example, shows a carbon fiber manufacturing system 100, wherein PAN fiber 5 is fed from carbon fiber precursor feed roll 10 over rollers 12*a* and 12*b*. PAN fiber 5 can comprise a plurality of multifilament PAN fiber tows. In some embodiments, PAN fiber 5 can comprises up to about 100 multifilament PAN fiber tows spread across the width of the carbon fiber manufacturing line (e.g., about 5, 10, 15, 20, 25, 30, 35, 40, 45, 50, 55, 60, 65, 70, 75, 80, 85, 90, 95 or about 100 tows). In some embodiments, PAN fiber 5 can comprise more than 100 multifilament PAN fiber tows (e.g., about 150, 200, 250, 300, 400, or about 500 or more tows).

Continuing with FIG. 1, PAN fiber 5 is pulled through carbonization processing stage 20, which includes oxidation oven 22, first carbonization furnace 24*a*, and second carbonization furnace (or graphitization furnace) 24*b*. Carbon fiber 7 exits carbonization processing stage 20 and is guided by rollers 14*a* and 14*b*, to surface treatment bath 30. Surface treatment bath 30 contains surface treatment solution 32, which can be, for example, an aqueous solution of an electrolyte, such as ammonium bicarbonate, to clean and etch the surface of carbon fiber 7. Rollers 16*a*, 16*b*, and 16*c* guide carbon fiber 7 through surface treatment bath 30, under the surface of surface treatment solution 32. Then, in some cases, carbon fiber 7 can be guided through optional sizing bath 40 by rollers 18*a*, 18*b*, and 18*c*. Sizing bath 40 includes a sizing solution 42. The sizing bath can add a very small amount of sizing, typically on the order of about 1% by weight, to the surface of the carbon filaments of carbon fiber 7. Sizing solution 42 can be an aqueous dispersion or solution of a sizing agent selected based on the polymer to be added to the carbon fiber in a composite application. Sizing chemistry and application technology is known in the carbon fiber manufacturing industry. Sizing agents can include, but are not limited to, polymers compatible with the polymer to be used in the CRFP product produced with the carbon fiber. Such materials include, but are not limited to, epoxy and polyester resins, polyurethane resins, acrylic resins, polyvinyl alcohol (PVA), polyethylene oxide (PEO), ethylene oxide or propylene oxide copolymers, polyvinylpyrrolidone, dicyanformaldehyde resin, gelatin, etc.

Typically, once carbon fiber 7 exits surface treatment bath 30 (or optional sizing bath 40, if optional sizing bath 40 is used) it can be pulled through drying oven 50 and wound on carbon fiber roll 60. However, according to some embodiments of the presently disclosed subject matter, there are two locations A and B where system components and/or process steps for manufacturing carbon fiber intermediates can be introduced in-line with the carbon fiber production system. These in-line components and/or process steps can be applied to any number of the carbon fiber tows across the carbon fiber manufacturing line, while any remaining carbon fiber tows can continue to drying oven 50 and carbon fiber roll 60. In some embodiments, all of the carbon fiber tows are incorporated into the in-line carbon fiber intermediate production components and/or process steps. In some embodiments, one or more of the carbon fiber tows, but less than all of the carbon fiber tows, are incorporated into the in-line carbon fiber intermediate production components and/or process steps.

The total length of the additional components for the in-line production of carbon fiber intermediates is short enough to fit easily into an existing carbon fiber production facility. In some embodiments, the total length of the additional components for the in-line manufacture of carbon fiber intermediates is between about 2 meters and about 3 meters. In some embodiments, when only a portion of the one or more carbon fiber tows is incorporated into the in-line carbon fiber intermediate process or system components, the components of the in-line carbon fiber intermediate production system particular to carbon fiber intermediate production can be positioned on a raised platform (i.e., above the carbon fiber manufacturing line), to reduce overall space requirements.

As shown in FIG. 1, location A, for instance, is directly after carbon fiber 7 exits surface treatment bath 30 where it has been washed and rinsed to remove any remaining debris and scale on the surface of the carbon fiber filaments. Also, at this stage, the carbon filaments are slightly surface etched, increasing the filament surface area and enhancing the bond-ability of the filaments to composite matrix polymers used in downstream product forms. At this point, carbon fiber 7 is thus in its final structural morphology with all of its intended properties. Thus, in some embodiments, location A is used as the point of intervention in the carbon fiber manufacturing line to increase simplicity and lower costs. Many polymers to be applied to carbon fiber using the further processing steps described herein for producing carbon fiber intermediates can thoroughly wet all carbon filaments and provide desirable bonding properties in downstream intermediate and composite applications and/or impregnation components can be varied to increase wet out. However, in some embodiments, it can be desirable to enhance the wetting and bonding properties of the carbon fiber for a particular polymer by use of a sizing agent. Thus, returning to FIG. 1, alternative location B is directly after carbon fiber 7 exits optional sizing bath 40.

Figure 2:
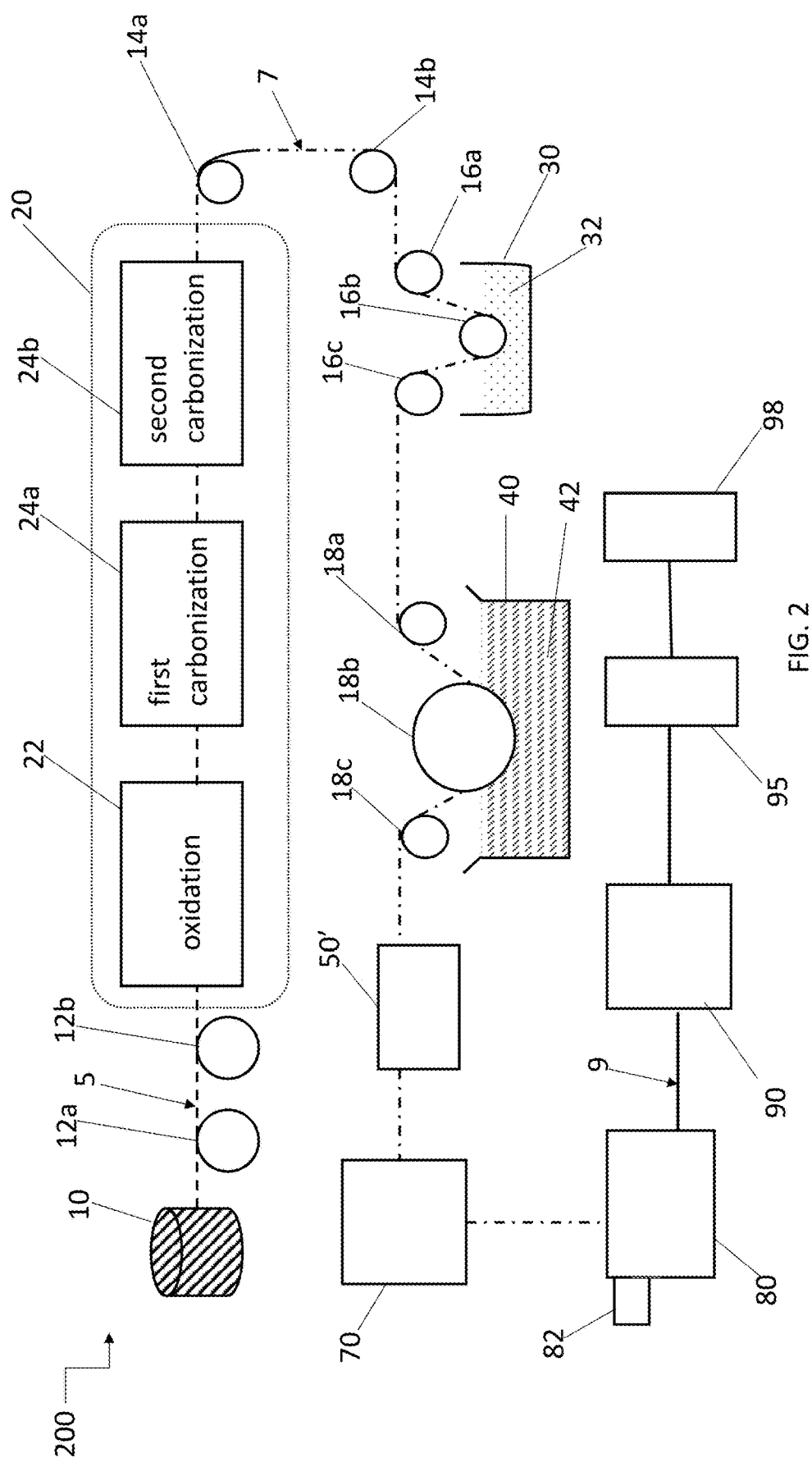
FIG. 2 is a schematic diagram showing a system for carbon fiber intermediate manufacturing according to an in-line system of the presently disclosed subject matter that includes components for producing the carbon fiber intermediates as part of a system for producing carbon fiber from a carbon fiber precursor.

FIG. 2 shows a schematic diagram illustrating a perspective view of one embodiment of an in-line carbon fiber intermediate system (i.e., an in-line carbon fiber manufacturing line) of the presently disclosed subject matter. The system is the same as that shown in FIG. 1, except that after optional sizing bath 40 (or after surface treatment bath 30 when sizing bath 40 is not used), the carbon fiber enters optional drying stage 50'. When optional sizing bath 40 and its related parts (i.e., sizing solution 42 and rollers 18a, 18b, and 18c) are absent, drying stage 50' can operate at a relatively high temperature, e.g., at or above about 200° C.

In some embodiments, drying stage 50' can be an air oven utilizing waste heat extracted from carbon fiber carbonization furnaces 24a and/or 24b. Alternatively, drying stage 50' can be a heated polished bar with sufficient contact area to fully dry the carbon fiber tow. In some embodiments, when drying stage 50' is a heated bar, drying stage 50' and heating stage 70, which are shown as two separate components in FIG. 2, can be the same component and drying and heating steps can be combined. When optional sizing bath 40 and its related parts (sizing solution 42 and rollers 18a, 18b, and 18c) are absent, higher drying temperatures are possible since this drying only evaporates water from the carbon fiber and the carbon fiber is stable at high temperatures. Since the carbon fiber manufacturing process operates at slow speeds, typically about 10 to about 15 feet/minute, the drying stage can be very short in length, allowing very low capital investment. This low capital investment along with use of waste heat make any additional cost of this step extremely low and can even reduce cost, since the sizing and its relatively slower drying steps in the carbon fiber manufacturing process are eliminated.

When insertion point B in FIG. 1 is used (i.e., when sizing bath 40, sizing solution 42, and rollers 18a, 18b, and 18c are present), the drying process could use the existing drying oven of the carbon fiber manufacturing line. i.e., drying stage 50' can be the same piece of equipment as drying oven 50 of FIG. 1. The drying is performed at lower temperatures so that water can be evaporated from the carbon fiber without negatively effecting the chemistry of the sizing agent that has been applied to the carbon fiber.

Continuing with FIG. 2, optional heating stage 70 is used to raise the temperature of the carbon fiber to the melt temperature of the polymer to be applied in impregnation die 80. Matching the fiber temperature to the melt temperature of the polymer resin used to wet the carbon fiber in a melt impregnation process promotes fiber surface wetting, leading to improved bonding of the fiber and matrix polymer in downstream products and applications. If insertion point B of FIG. 1 is used, optional heating stage 70 of FIG. 2 can comprise a heated polished bar with precisely controlled temperature. Alternatively, in some embodiments, when insertion point B of FIG. 1 is used, optional heating stage 70 of FIG. 2 can be removed since the applied sizing can be sufficient to achieve good fiber wetting by the polymer resin during the impregnation process. As noted above, if insertion point A of FIG. 1 is used, drying and heating processes can be combined and drying stage 50' of FIG. 2 can be eliminated.

Following drying and/or heating, carbon fiber 7 is pulled through impregnation die 80 where polymer from injector or extruder 82 is injected or extruded onto the carbon fiber tow or roving and is forced into the tow or roving, wetting the individual filaments of carbon fiber 7 and forming a uniform distribution of fibers and polymer. The particular design of impregnation die 80 can vary. In some embodiments, impregnation die 80 comprises a closed die with a slot (e.g., for an individual carbon fiber tow) or channel (e.g., for multiple tows) through the middle of the die along its length. The width of the channel can be approximately the width that the carbon fiber can be easily spread and controlled. The depth of the slot or channel can be controlled to achieve a desired amount of polymer being applied. The geometry of the slot or channel can include one or more shapes, e.g., an up and down wave form, a sign wave or similar shape, or a combination thereof, along the length of the of the die to assist the impregnation process. At the beginning of impregnation die 80, the polymer can be injected or extruded from extruder or injector 82 into a cavity in fluid communication with the slot or channel through which the carbon fiber is being pulled. This polymer injection or extrusion can be a melt process fed by extruder injector 82 (which can include a metering pump) with controlled polymer flow into die 80 to achieve a desired amount of polymer being applied to the carbon fiber. Extruder or injector 82 can be heated to a suitable temperature correspondence to temperatures close to the melt temperature of the polymer resin being injected or extruded. In some embodiments, impregnation die 80 can be heated, e.g., with electrical cartridge heaters, to keep the temperature at the desired melt temperature for the polymer.

While FIG. 2 shows single impregnation die 80, in some embodiments, there can be a plurality of impregnation dies spread across the width of the production system so that each carbon fiber tow or roving can have its own die. Alternatively, in some embodiments, one or more of the impregnation dies can have several parallel slots for multiple carbon fiber tows. This can be determined based on the particular amount of space available in the carbon fiber manufacturing facility and the desired operational conditions. In some embodiments, the one or more impregnation dies have the ability to be opened during processing in case restringing of a broken tow is desired. Additional impregnation components are described further hereinbelow.

Returning to FIG. 2, after exiting impregnation die 80, impregnated carbon fiber 9 can be fed into cooling stage 90, where impregnated carbon fiber can be rapidly cooled to establish a solidified product geometry. In some embodiments, an impregnated carbon fiber tow or roving as it exits impregnation die 80 can be maintained in a relatively flat tape or ribbon geometry when it is cooled. Alternatively, in some embodiments, a polymer impregnated carbon fiber roving or tow, while it is still in a molten or heated condition, can be shaped into a rod geometry with a circular or other shaped cross-section and then cooled it to form alternative product geometries. More particular cooling stage components are described hereinbelow.

After being cooled in cooling stage 90, impregnated carbon fiber 9 can be pulled through an optional puller system 95 to maintain process speed and tension and to feed impregnated carbon fiber 9 into a chopper or pelletizer or onto a winder in product processing stage 98. For example, tapes or rods exiting from cooling stage 90 can be pulled through puller system 95 and wound up as continuous products using a winder in product processing stage 98. Alternatively, the tapes or rods can be chopped or pelletized into flake or pellet product forms and packed in boxes or bags or other containers (i.e., when product processing stage 98 comprises a chopper and/or a pelletizer).

Figure 3A:
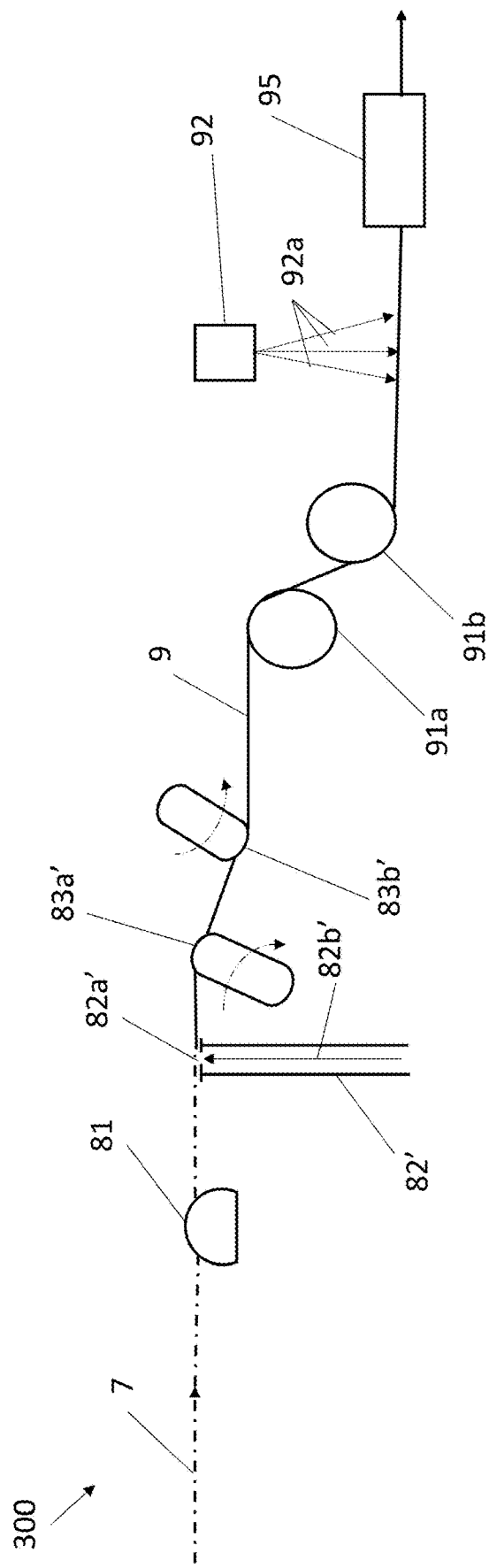
FIG. 3A is a schematic diagram of a side view of impregnation and cooling components of an in-line system for producing carbon fiber intermediates during carbon fiber production according to an embodiment of the presently disclosed subject matter.

FIG. 3A shows partial perspective view of impregnation and cooling components 300 of an exemplary embodiment of a carbon fiber intermediate in-line manufacturing system of the presently disclosed subject matter. On the left side of FIG. 3A is carbon fiber 7 after exiting heating stage 70 as shown in FIG. 2. Carbon fiber 7 is fed over spreader bar 81 and over opening 82a' in polymer slot die 82' through which polymer resin 82b' is directed toward a carbon fiber 7. After passing over opening 82a', the resulting impregnated carbon fiber 9 is fed though rotatable rounded impregnation bars 83a' and 83b' to more fully wet the carbon fiber filaments with polymer resin. Then, impregnated carbon fiber 9 is guided through free turning cylinders 91a and 91b while the cooling stage begins (e.g., when impregnated carbon fiber 9 is exposed to ambient temperature) and then under jet 92, which sprays impregnated carbon fiber 9 with streams 92a of cooled water or cooled air to complete the cooling process. The cooled material is then pulled through optional puller 95 and to either a chopper or a pelletizer (in embodiments related to a discontinuous intermediate product) or onto a winder (in embodiments related to a continuous intermediate product). The use of free turning cylinders 91a and 92b results in a ribbon- or tape-like structure. If a rod-shaped structure is desired, cylinders 91a and 91b can be replaced by a die with an outlet and/or internal channel having a suitable cross-sectional shape (e.g., a circle, square, rectangle, or oval).

Figure 3B:
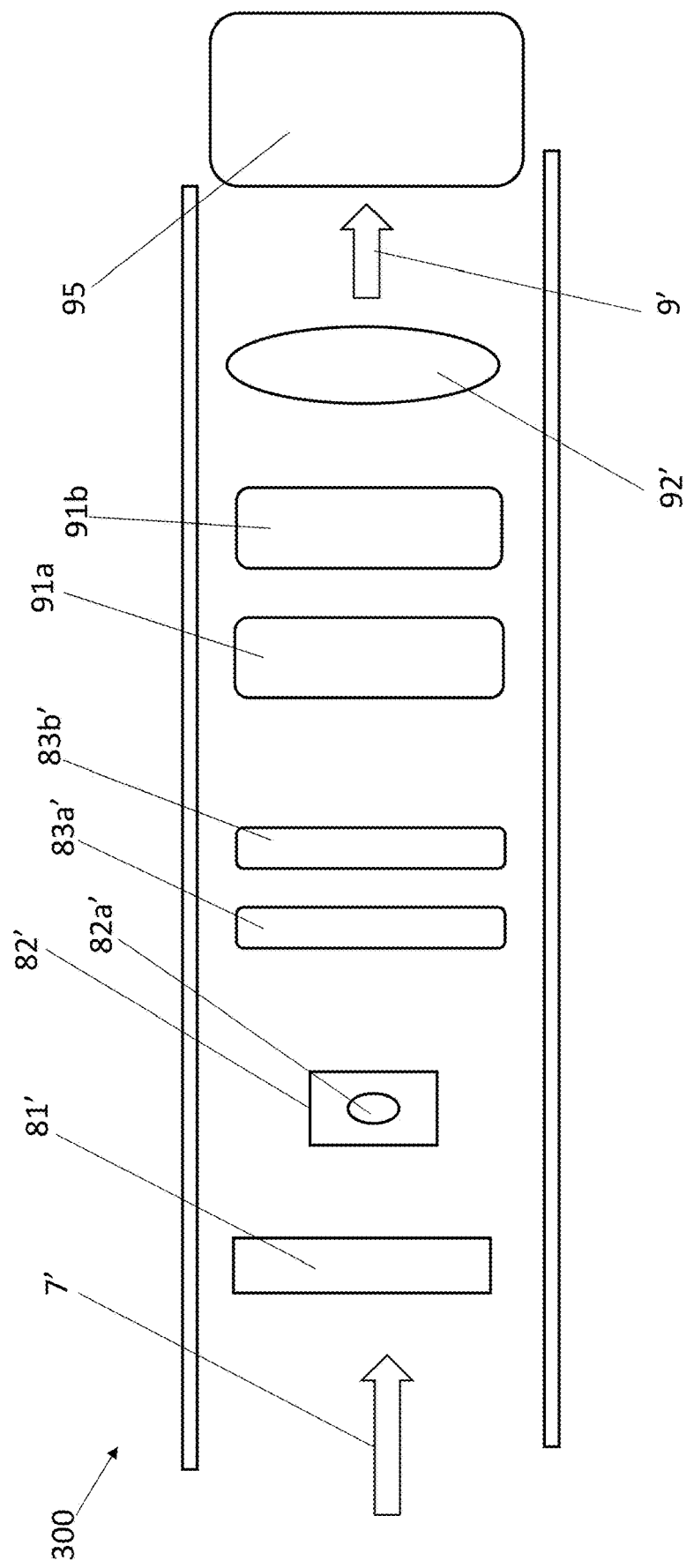
FIG. 3B is a schematic diagram of a top view of the components shown in FIG. 3A.

FIG. 3B shows a top, partial view of the impregnation and cooling components 300 shown in FIG. 3A. Arrow 7' shows the direction of carbon fiber as it traverses the system, while arrow 9' shows the direction of impregnated carbon fiber as it traverses the system. After spreader bar 81', slot die 82' includes at least one opening 82a' for polymer to be injected or pumped. After impregnation bars 83a' and 83b' and free turning cylinders 91a and 91b, area 92' shows the portion of the system that is impinged by cooled water or air from jet 92 of FIG. 3A. As in FIG. 3A, the cooled fiber is pulled through puller 95.

Figure 4A:
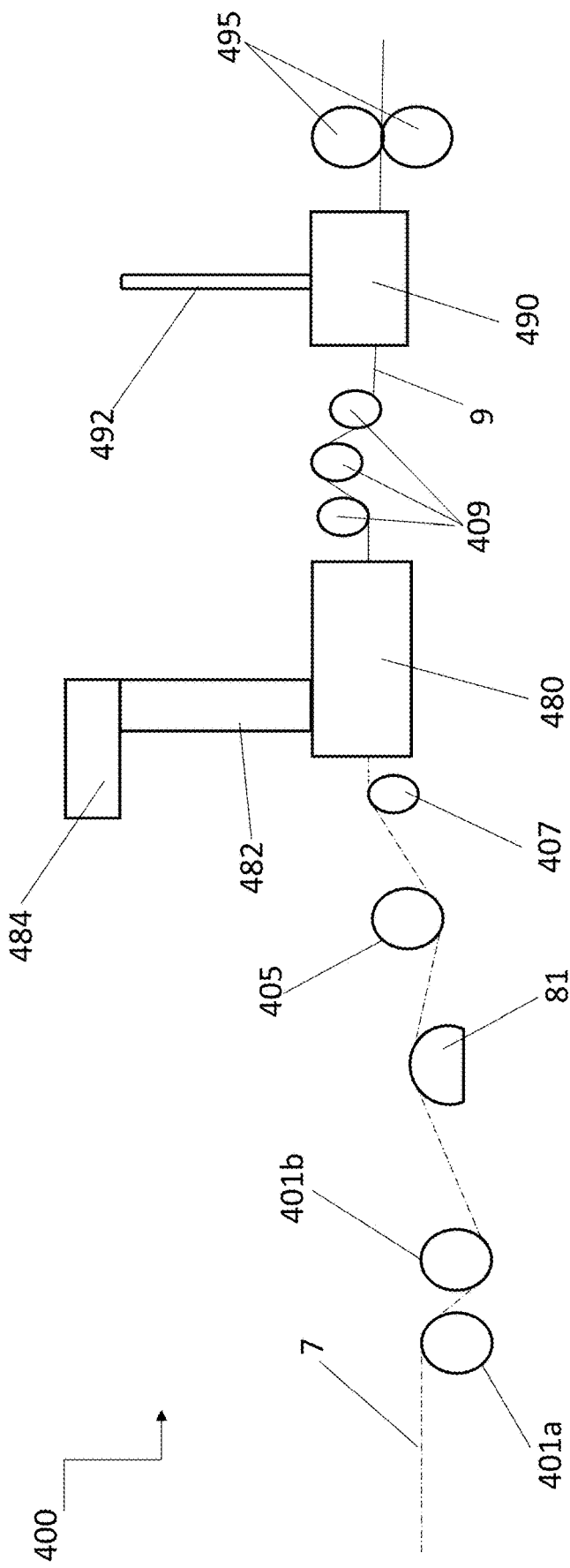
FIG. 4A is a schematic diagram of a side view of impregnation and cooling components of an in-line system for producing carbon fiber intermediates during carbon fiber production according to an alternative embodiment of the presently disclosed subject matter.

FIG. 4A shows impregnation die and cooling components 400 of an alternative exemplary in-line system of the presently disclosed subject matter. On the left of FIG. 4A, carbon fiber 7 is pulled through tensioning rolls 401a and 401b and then over spreader bar 81. In some embodiments, spreader bar 81 is heated. Then carbon fiber 7 is pulled through pulley 405 to maintain tension and guide carbon fiber 7 over heated pin 407 just prior to entering impregnation die 480. Inside impregnation die 480, carbon fiber 7 is flooded with polymeric resin provided to impregnation die 480 from single screw extruder 482, which is in fluid communication with polymer feed tube 484.

After exiting impregnation die 480, impregnated carbon fiber 9 is pulled through a cooling stage to be shaped and cooled. The cooling stage includes series of heated exit pins, 409, which maintain impregnated carbon fiber 9 in a tape or ribbon form, and cooling chamber 490, which as shown in FIG. 4A is connected to cooled air hose 492. As shown in FIG. 4A, the pulling can be performed by puller 495, positioned after cooling chamber 490.

FIG. 4B shows an internal side view of impregnation section 400a of components 400 shown in FIG. 4A, which includes impregnation die 480. More particularly, as shown in FIG. 4B, after carbon fiber 7 is pulled through pully 405 and over heated pin 407, it enters inlet 481a of impregnation die 480. The inside of impregnation die 480 is filled with polymeric resin 8, which is fed into impregnation die 480 from extruder 482, which is in fluid communication with polymer feed tube 484, which includes inlet 484a for receiving polymeric resin 8. After exiting outlet 481b of impregnation die 480, impregnated carbon fiber 9 is pulled through heated exit pins 409.

Figure 4C:
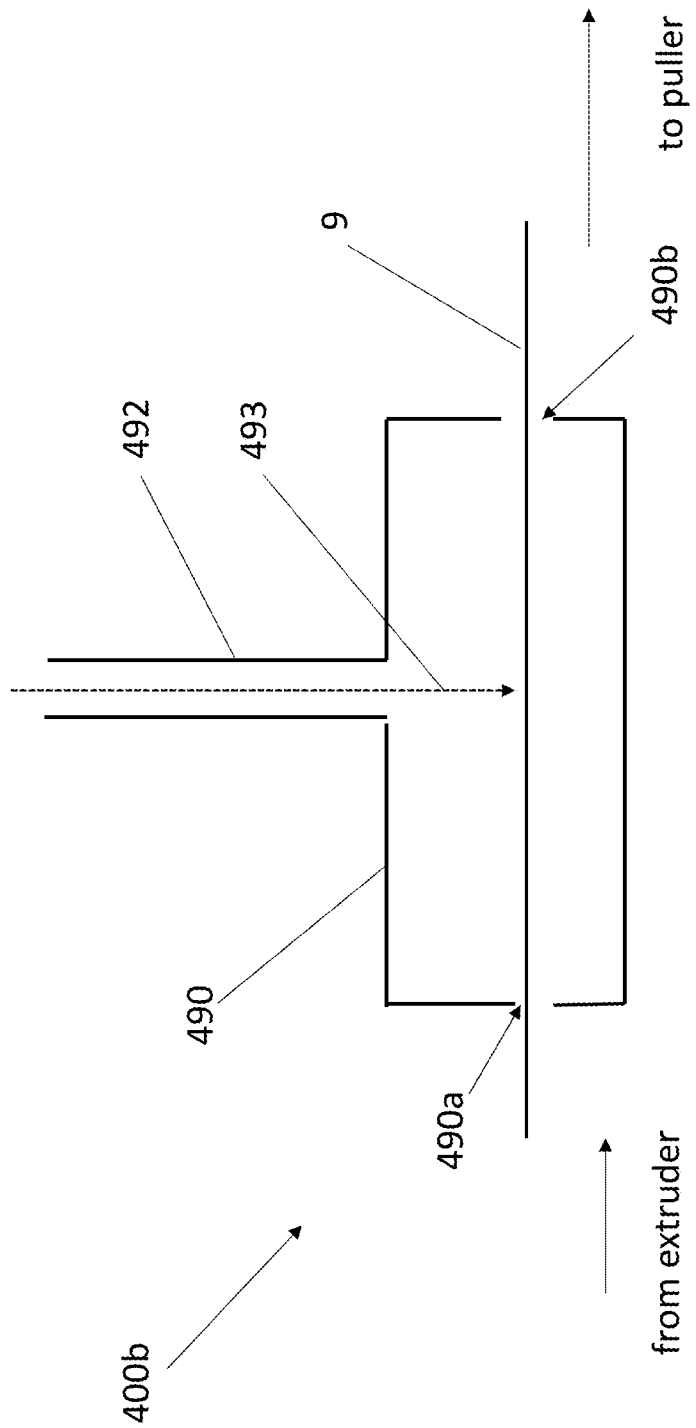
FIG. 4C is a schematic diagram showing an internal side view of the cooling components shown in FIG. 4A.

FIG. 4C shows an internal side view of cooling components 400b of the in-line system 400 shown in FIG. 4A, which includes cooling chamber 490. More particularly, as shown in FIG. 4C, impregnated carbon fiber 9 enters inlet slot 490a of cooling chamber 490 which comprises a chamber into which stream 493 of cooled air can be directed through cooled air hose 492. Inside cooling chamber 490, stream 493 impinges impregnated carbon fiber 9, which is then pulled out of outlet slot 490b.

Figure 4D:
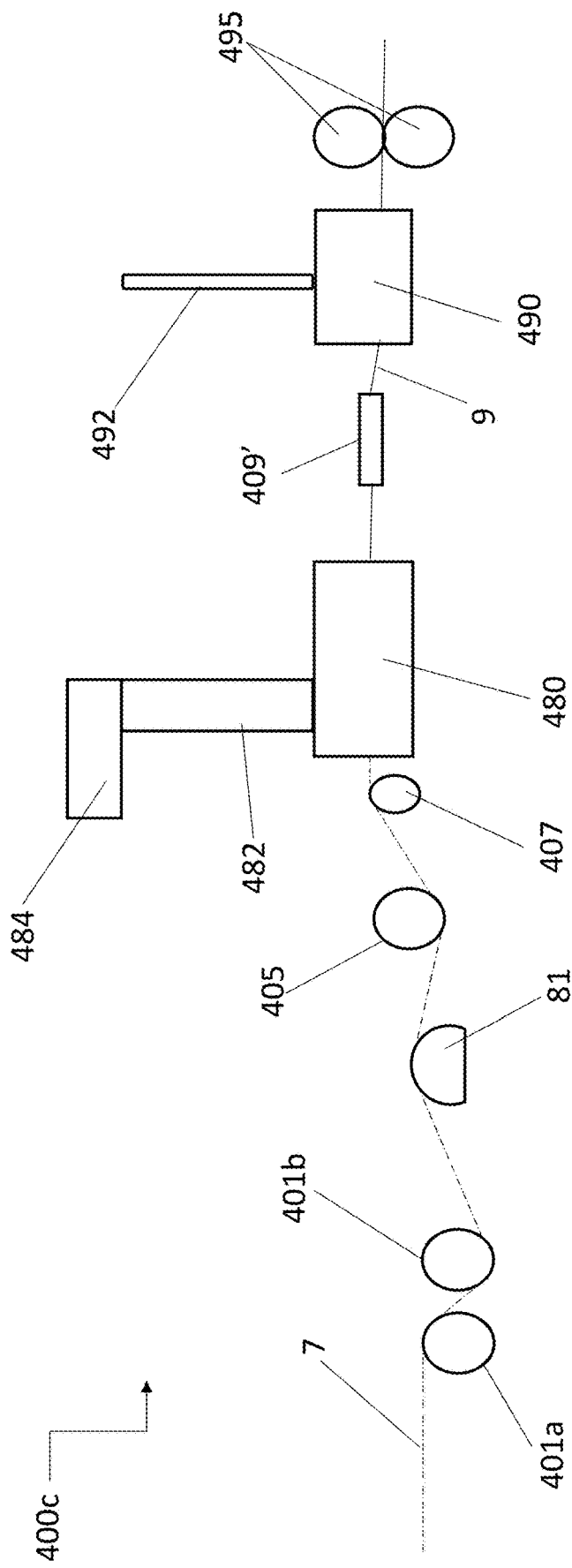
FIG. 4D is a schematic diagram showing a side view of impregnation and cooling components of the in-line system shown in FIG. 4A modified to prepare rod-shaped carbon fiber intermediates.

If a rod-shaped intermediate product is desired, components 400 of FIG. 4A can be modified as shown in FIG. 4D. FIG. 4D shows impregnation die and cooling stage components 400c, a portion of another exemplary alternative embodiment of the presently disclosed subject matter. As in FIG. 4A, on the left of FIG. 4D, carbon fiber 7 is pulled through tensioning rolls 401a and 401b and then over spreader bar 81, which can be a heated. Carbon fiber 7 is pulled through pulley 405 to maintain tension and guide carbon fiber 7 over heated pin 407 just prior to entering impregnation die 480. Also, as in FIGS. 4A and 4B, inside impregnation die 480, carbon fiber 7 is flooded with polymeric resin provided to impregnation die 480 from single screw extruder 482, which is in fluid communication with polymer feed tube 484. The cooling stage includes shaping die 409' in place of heated exit pins 409 of FIG. 4A. Shaping die 409' can be used to compress impregnated carbon fiber into more compressed form, e.g., a rod, having a desired cross-sectional shape, which can be determined by the geometry of the shape of the exit of die 409'. After exiting shaping die 409', impregnated carbon fiber 9 is pulled through cooling chamber 490, which is connected to cooled air hose 492, and then through puller 495.

Additional potential modifications include placing an exit die directly after one or more impregnation die to increase interaction of the polymer resin with the carbon fiber filaments and to get more wet out of the polymer into the fiber. FIG. 7A, for example, shows a schematic diagram including an exemplary two die sequence (e.g., that can be used in place of impregnation die 80 in FIG. 2 or 480 of FIGS. 4A and 4D). As shown on the left of FIG. 7A, carbon fiber 7 is pulled through channel 714 of first die 710, which is an impregnation die, and then, preliminarily impregnated carbon fiber 9 is pulled through second die 720, an exit die, to increase polymer wet out. First die 710 is a heated impregnation die with die body 712 including opening 716 through which polymer resin can be fed or injected into channel 714 to interact with carbon fiber 7. As shown in FIG. 7A, second die 720 can include two cartridge heaters, 722a and 722b, housing a sequence of pins or rollers, which as shown in FIG. 7A includes fixed pins 724a, 724b, and 724c and adjustable rollers 726a and 726b, which are each positioned between two fixed pins. FIG. 7B shows additional details of an exemplary embodiment of the sequence of pins or rollers of second die 720 of FIG. 7A through which impregnated carbon fiber 9 is being pulled to increase wet out. In the embodiment shown in FIG. 7B, adjustable rollers 726a and 726b are adjustable in a vertical direction, while fixed pins 724a, 724b, and 724c are each heated with cartridge heaters 725a, 725b, and 725c. The number of pins and rollers in the exit die and the brake angle of carbon fiber 9 as it is pulled through the pins and rollers can be adjusted to increase impregnation through the carbon fiber, e.g., to achieve 100% impregnation.

The end carbon fiber intermediate products produced by the presently disclosed processes and/or systems can take continuous or discontinuous formats as discussed above. They can also have varying fiber contents, which can be controlled by process steps. In some embodiments, the intermediate products comprise between about 30 weight % (wt %) and about 90 wt % polymer (e.g., between about 10 wt % fiber and about 70 wt % fiber). In some embodiments, the intermediate products comprise between about 50 wt % and about 80 wt % polymer (i.e., between about 20 wt % fiber and about 50 wt % fiber). Downstream applications of continuous products prepared according to the presently disclosed subject matter include, but are not limited to, pultrusion, filament winding, tape placement, and insert over-molding and other similar localized reinforcement concepts. Downstream applications of discontinuous products prepared according to the presently disclosed subject matter include, but are not limited to, short fiber and long fiber injection molding, sheet molding and bulk molding products and processes, and a variety of other molding processes.

III. Process for Preparing CFRP Intermediate Product In-Line with Carbon Fiber Preparation Accordingly, in some embodiments, the presently disclosed subject matter provides a process for preparing a CFRP intermediate product, wherein the CFRP intermediate product comprises carbon fiber and a thermoplastic or thermosetting polymeric matrix. In some embodiments, the process comprises forming carbon fiber from a carbon fiber precursor and in-line impregnating the carbon fiber with a polymeric resin, thereby providing carbon fiber and a CFRP intermediate product as part of a single, continuous process (e.g., using a single or integrated production line). In some embodiments, the presently disclosed subject matter provides a process for preparing a CFRP intermediate product, wherein the CRFP intermediate product comprises carbon fiber and a thermoplastic or thermosetting polymeric matrix, the process comprising: (a) providing a carbon fiber precursor; (b) treating the carbon fiber precursor to form carbon fiber; (c) surface treating the carbon fiber, wherein the surface treating comprises washing and/or surface oxidizing and/or surface etching the carbon fiber; (d) impregnating the carbon fiber with a polymeric resin corresponding to the thermoplastic or thermosetting polymeric matrix of the CFRP intermediate product, thereby providing impregnated carbon fiber; (e) cooling the impregnated carbon fiber to provide a cooled, impregnated carbon fiber having a desired geometry; and (f) processing the cooled, impregnated carbon fiber to provide the CFRP intermediate product, wherein steps (a)-(f) are carried out in a continuous process, e.g., using a single or integrated manufacturing line.

During typical carbon fiber manufacturing, carbon fiber process line speeds can be varied at different points in the line (e.g., to incorporate stretching processes, such as during the oxidation of PAN fibers). However, the carbon fiber process line is typically constant after the carbon fiber precursor has passed through the carbonization furnaces. The presently disclosed process can be performed at a line speed used in a carbon fiber manufacturing line after carbonization. Thus, in some embodiments, steps (c)-(f) are performed in a continuous process at a single processing speed.

Any suitable carbon fiber precursor can be used. The carbon fiber precursor can be a synthetic or natural polymer. In some embodiments, the carbon fiber precursor can be provided in fiber form, e.g., as one or more fiber tows. In some embodiments, each fiber tow comprises at least about 1,000 filaments. In some embodiments, each fiber tow comprises at least about 3,000 or at least about 5,000 filaments. In some embodiments, each fiber tow comprises at least about 10,000 filaments, at least about 20,000 filaments, at least about 30,000 filaments, or at least about 50,000 filaments. In some embodiments, each fiber tow comprises between about 3,000 and about 50,000 filaments. In some embodiments, each tow comprises more than 50,000 filaments. The number of filaments in the carbon fiber precursor fiber tows corresponds to the number of filaments in the carbon fiber produced therefrom. In some embodiments, the carbon fiber precursor is selected from the group comprising poly(acrylonitrile) (PAN) fiber, rayon fiber, cellulose fiber, and pitch fiber (e.g., mesoporous petroleum pitch).

In some embodiments, such as when the carbon fiber precursor comprises a synthetic material like PAN or rayon, the carbon fiber precursor can be prepared by spinning a spinning dope comprising a PAN copolymer or rayon dissolved in an organic solvent (e.g., dimethyl acetamide, dimethyl sulfoxide, or dimethylformamide) or an aqueous solution using a method known in the art (e.g., a wet spinning method, a dry-wet spinning method, or a dry spinning method) to provide PAN fiber. In some embodiments, the spun fibers can then be washed, dried, and/or stretched. Alternatively, the carbon fiber precursor can be purchased from a commercial source.

In some embodiments, step (b) comprises carbonizing the carbon fiber precursor, e.g., by passing it through a carbonization furnace at a temperature sufficient to drive off non-carbon atoms and carbonize the precursor material. In some embodiments, the carbonizing comprises carbonizing the precursor material to provide carbon fiber comprising at least about 90% carbon, at least about 95% carbon or at least about 98% carbon. In some embodiments, the carbon fiber precursor comprises PAN fiber and step (b) comprises: (b1) oxidizing the PAN fiber to provide oxidized and/or stabilized PAN fiber; and (b2) carbonizing the oxidized and/or stabilized PAN fiber. In some embodiments, the oxidizing can be performed in an oxidizing atmosphere (e.g., comprising oxygen or nitrogen dioxide) at a temperature between about 180° C. and about 400° C. (e.g., about 180, 200, 220, 240, 260, 280, 300, 320, 340, 360, 380, or about 400° C.). In some embodiments, the carbonizing can be performed by passing the oxidized and/or stabilized PAN fiber through one or more carbonization furnaces, wherein each carbonization furnace has an internal temperature between about 1000° C. and about 3000° C. (e.g., about 1000, 1250, 1500, 1750, 2000, 2250, 2500, 2750, or about 3000° C.). In some embodiments, the one or more furnaces is filled with an inert gas (e.g., nitrogen or argon). In some embodiments, the carbonizing is performed by passing the oxidized and/or stabilized PAN fiber through two carbonization furnaces.

In some embodiments, the surface treating comprises pulling the carbon fiber through one or more surface treatment baths, e.g., wherein one of the one or more surface treatment baths comprises an aqueous solution of an electrolyte, such as, but not limited to ammonium bicarbonate or sodium hypochlorite, or sprayed with water or an aqueous solution to clean the fiber surface of debris or scale. In some embodiments, the chemicals in the surface treatment bath can be selected to etch or roughen the surface of the fiber, thereby increasing the surface area available for interfacial fiber/matrix bonding and to add reactive chemical groups (e.g., to oxidize the surface of the fiber). In some embodiments, the carbon fiber can be pulled through the one or more surface treatment baths using one or more rollers.

In some embodiments, the carbon fiber comprises a plurality of carbon fiber tows and step (d) is performed on one or more carbon fiber tows directly after surface treating step (c). Alternatively, in some embodiments, a drying step is inserted between steps (c) and (d) to remove any water present on the carbon fiber surface. In some embodiments, in the optional drying step, the carbon fibers can be pulled through a drying oven (e.g., a drying oven already present in the carbon fiber manufacturing line) and/or pulled over a heated bar or a series of heated bars.

In some embodiments, a heating step is inserted after step (c) or after the optional drying step and prior to step (d). In the heating step, the carbon fiber is heated to a melt temperature of a polymeric resin used to impregnate the carbon fiber in step (d) (i.e., a polymeric resin corresponding to the thermoplastic or thermosetting polymeric matrix of the CFRP intermediate product being produced). In some embodiments, the heating can be performed by pulling the carbon fiber through an oven. In some embodiments, the heating can be performed by pulling the carbon fiber over a heated, polished bar (e.g., placed just prior to the entry of one of more of the impregnation dies). Heating the carbon fiber to the melt temperature of the polymeric resin can increase the interaction of the carbon fiber and the polymeric resin, leading to increased wet out of the carbon fiber.

In some embodiments, step (d) comprises pulling the carbon fiber through one or more impregnation dies and injecting or extruding the polymeric resin into the one or more impregnation dies. In some embodiments, the carbon fiber comprises at least two carbon fiber tows (e.g., at least two, at least 10, at least 20, at least 50, at least 100, at least 200, at least 500, or more than 500 carbon fiber tows) and the carbon fiber can be pulled over a spreader bar prior to entry into the one or more impregnation dies. In some embodiments, each of the at least two carbon fiber tows is pulled through a separate impregnation die. In some embodiments, two or more carbon fiber tows are pulled through the same impregnation die. In some embodiments, one or more impregnation die can have a plurality of slots and each carbon fiber tow pulled through the impregnation die can be pulled though a single slot in the impregnation die. Thus, in some embodiments, the spreader bar spreads two or more carbon fiber tows in the carbon fiber (i.e., width-wise across the manufacturing line) so that each of the carbon fiber tows are directed toward an entry of one of the one or more impregnation dies. In some embodiments, the spreader bar spreads two or more carbon fiber tows in the carbon fiber so that each of the two or more carbon fiber tows are directed toward one of at least two slots at the entry of one of the one or more impregnation dies. In some embodiments, the spreader bar spreads the carbon fiber so that the carbon fiber comprises a single layer of carbon fiber tows.

In some embodiments, the one or more impregnation dies are heated to a melt temperature of the polymeric resin. In some embodiments, the one or more impregnation dies comprise a solid body, one or more slots, channels, or chambers through which carbon fiber can be pulled, and at least one opening for receiving polymeric resin that is in fluid communication with the slots, channels, or chambers. In some embodiments, an extruder is attached to each of the one or more impregnation dies. In some embodiments, the extruder is heated to one or more temperatures (i.e., in different zones in the extruder) to heat the resin prior to its entry in to the one or more impregnation dies.

The polymeric resin used to impregnate the carbon fiber can be any suitable polymeric resin can be used to provide a CRFP intermediate product with a desired property. Accordingly, virtually any thermoplastic resin or thermosetting resin suitable for forming into articles by thermal processes, molding, extrusion, or other such processes can be used. For example, and without limitation, the following thermoplastic materials can be used: acrylonitrile-butadiene-styrene (ABS) resins; acetal resins; acrylics; acrylonitriles (AN); allyl resins; cellulosics; epoxies; polyarylether ketones; polyether etherketones (PEEK); liquid crystal polymers, such as those sold under the tradename Xydar by Amoco Polymers Inc., Atlanta, Georgia, United States of America; amino resins, including melamine, melamine formaldehyde resins, urea formaldehyde resins, guanidines, and so on; phenolics; polyamides, such as nylon 6 (polycaprolactam), nylon 66, poly(tetra-methylene) adipamide and polyphthalamide; polyimides; polyamide-imide resins; polyolefins, such as polyethylene, polypropylene (PP), and polybutylene homopolymers and copolymers; polycarbonates; polyesters, such as polyalkylene terephthalates including, without limitation, polybutylene terephthalate (PBT) and polyethylene terephthalate (PET); polyimides and polyetherimides; polyphenylene oxide; polyarylene sulfites such as polyphenylene sulfite; polyarylene sulfides such as polyphenylene sulfide; polyvinyl resins, including, without limitation, polystyrene (PS) and copolymers of styrene such as styrene-acrylonitrile copolymer (SAN), polyvinyl chloride (PVC), and polyvinylphenylene chloride; polyurethanes; and polysulfones, including, without limitation, polyaryl-ether sulfones, polyether sulfones, and polyphenyl sulfones. In some embodiments, the polymeric resin comprises a thermoplastic polymer selected from the group comprising a polyolefin, a polyamide, a polyimide, and a polyurethane. In some embodiments, the thermoplastic resin can have a melting point, or softening point of up to about 750° C. In some embodiments, the polymeric resin comprises a thermosetting polymer selected from the group comprising an epoxy (e.g., an epoxy that cures with amines, acids or acid anhydrides), a polyimide, and a polyester (e.g., a polyester that cures through unsaturation). Additional exemplary thermosetting resins include bismaleimides and phenolics. In some embodiments, the polymeric resin comprises a mixture of two or more resins.

In some embodiments, the resin can include one or more additives, such as, but not limited to, impact modifiers, mold release agents, lubricants, thixotropes, antioxidants, UV absorbers, heat stabilizers, flame retardants, pigments, colorants, nonfibrous reinforcements and fillers, plasticizers, impact modifiers such as ionomers or maleated elastomers, and other ingredients and additives known in the field. In the case of a thermoset resin, a catalyst or initiator for the curing reaction can be included.

The melt flow rate (MFR) of the polymeric resin is not particularly limited. The MFR (or melt flow index (MFI)) of a polymeric resin is a measure of the ease of flow of a melted plastic. MFI can be determined, for example, as described in ASTM D1238 and ISO 1133. Briefly, a small sample of about 5 grams is heated above its melting or softening point and forced through a capillary using a piston actuated by a specified weight, e.g., about 2.16 kilograms (kg) or about 5 kg. The weight of melt in grams flowing through the capillary in 10 minutes is the MFI or MFR. In some embodiments, the polymeric resin used according to the presently disclosed subject matter has a MFR of between about 5 and between about 100.

In some embodiments, a flow enhancer (i.e., a low molecular weight polymer of the same composition as the polymeric resin) can be added to the polymeric resin to increase the MFR. In some embodiments, the polymeric resin is mixed with a flow enhancer to provide a mixture of about 20%, about 30% or about 40% flow enhancer. The addition of the flow enhancer can provide a smoother surface finish for the impregnated carbon fiber and/or increase the ability to flood the impregnation die with polymer resin. Suitable flow enhancers include, but are not limited to, ProFlow and other resins from Polyvisions Inc. (Manchester, Pennsylvania, United States of America). In some embodiments, the flow enhancer can have a MFR of more than 100. In some embodiments, extruder size can be adjusted based on the MFR. For instance, when a lower MFR resin is used, a larger extruder can be employed.

In some embodiments, wet out of the carbon fiber with the polymeric resin can be increased by pulling the carbon fiber though one or more rollers, one or more rotatable rounded bars (also referred to herein as "impregnation bars"), or an exit die (comprising one or more rollers, bars and/or pins). Thus, in some embodiments, step (d) further comprises pulling the impregnated carbon fiber exiting the one or more impregnation dies through a series of rollers or impregnation bars or through an exit die. In some embodiments, the rollers, impregnation bars, or exit die is heated, e.g., to keep the resin melted while it is pushed further though a carbon fiber tow to wet out additional individual filaments therein).

In some embodiments, the impregnated carbon fiber comprises between about 10 weight % (wt %) and about 70 wt % carbon fiber. In some embodiments, the impregnated carbon fiber comprises between about 25 wt % and about 50 wt % carbon fiber (e.g., about 25, 26, 27, 28, 29, 30, 31, 32, 33, 34, 35, 36, 37, 38, 39, 40, 41, 42, 43, 44, 45, 46, 47, 48, 49, or about 50 wt % carbon fiber). In some embodiments, the impregnated carbon fiber comprises between about 35 wt % carbon fiber and about 45 wt % carbon fiber.

During cooling step (e), the polymeric resin in the impregnated carbon fiber cools and solidifies. In addition, the impregnated carbon fiber can be shaped during cooling to provide a desired cross-sectional shape. For example, if a continuous tape or ribbon is the desired intermediate product, or if relatively flat chips or flakes are desired, the ribbon- or tape-like geometry of the impregnated carbon fiber after it leaves step (d) can be maintained and/or further smoothed by pulling the impregnated carbon fiber though one or more rollers. The one or more rollers can include a series of at least two free turning cylinders through while the impregnated carbon fiber can be pulled. Alternatively, if a rod-shaped geometry is desired for the CFRP intermediate product (either as a continuous rod-shaped product or as discontinuous rod-shaped pellets), the cooling process can comprise shaping the impregnated carbon fiber to have a circular or other cross-sectional shape (e.g., an oval, square, rectangle, triangle, or any other regular or irregular cross-sectional shape). The shaping can be performed by applying pressure (e.g., mechanically or manually) to the sides of a tow of impregnated carbon fiber, decreasing the width of the tow. This can be referred to as "bunching." In some embodiments, the shaping can be performed by pulling the impregnated carbon fiber through a die having an outlet and/or interior channel with a desired cross-sectional shape (i.e., a circle or other shape).

In some embodiments, the cooling can comprise or further comprise cooling the impregnated carbon fiber by contacting it with cooled air or cooled water. In some embodiments, the cooling can comprises impinging a surface of the impregnated carbon fiber with one or more streams of cooled air or water (e.g., from one or more jets or hoses). In some embodiments, the cooled air or water stream or streams can be directed at a top surface of the impregnated carbon fiber. In some embodiments, the impregnated carbon fiber is pulled through a chamber filled with cooled air (e.g., from an air hose connected to the chamber).

In some embodiments, the carbon fiber precursor, carbon fiber, and/or impregnated carbon fiber is pulled through a pulley, a puller device, or a tensioning roll to maintain a desired line speed and/or tension. In some embodiments, the impregnated carbon fiber is pulled through a puller device prior to step (f) (and after step (e)) to maintain a desired speed and/or tension and/or to feed the cooled, impregnated carbon fiber into a chopper or a pelletizer or onto a winder.

In some embodiments, the single processing speed of steps (c)-(f) is between about 3 feet per minute and about 15 feet per minute (e.g., about 3, 4, 5, 6, 7, 8, 9, 10, 11, 12, 13, 14, or about 15 feet per minute). In some embodiments, the single processing speed is between about 8 feet per minute and about 13 feet per minute. In some embodiments, the processing speed is between about 12 feet per minute and about 13 feet per minute. In some embodiments, the single processing speed for steps (c)-(f) is between about 12 feet per minute and about 13 feet per minute and the impregnated carbon fiber comprises between about 30 wt % and about 45 wt % carbon fiber.

In some embodiments, step (f) comprises winding the cooled, impregnated carbon fiber onto a roller to provide a roll of a continuous tape, ribbon, or rod-shaped CFRP intermediate. In some embodiments, step (f) comprises chopping or pelletizing the cooled, impregnated carbon fiber to provide chips, flakes, or pellets of the CFRP intermediate.

IV. Systems for In-Line Production of CFRP Intermediate Products

In some embodiments, the presently disclosed subject matter provides a system for preparing a CFRP intermediate product (comprising carbon fiber and a thermosetting or thermoplastic polymeric matrix) from a carbon fiber precursor. Representative systems are described in FIGS. 1A-4 and FIGS. 7A and 7B described herein above. Further, in some embodiments, the system comprises: (i) a carbon fiber precursor feed roll; (ii) a carbonization processing stage comprising one or more ovens and/or furnaces, positioned to receive carbon fiber precursor fiber from the carbon fiber precursor feed roll and wherein the carbon fiber precursor fiber is carbonized to form carbon fiber; (iii) a surface treatment stage, comprising a bath or other treatment chamber, positioned to receive carbon fiber from the carbonization processing stage, and wherein carbon fiber is cleaned and/or oxidized and/or etched; (iv) one or more impregnation dies for impregnating the carbon fiber with a polymer resin corresponding to the thermoplastic or thermosetting polymeric matrix of the CFRP intermediate product, wherein the one or more impregnation dies are positioned to receive the carbon fiber after the surface treatment stage; (v) a cooling stage, positioned to receive impregnated carbon fiber after the impregnated carbon fiber exits the one or more impregnation dies, and wherein the impregnated carbon fiber is cooled; and (vi) a product processing stage, positioned to receive cooled, impregnated carbon fiber after it exits the cooling stage and wherein the cooled, impregnated carbon fiber is processed into a desired form of the CFRP intermediate product.

In some embodiments, carbonization processing stage (ii) comprises (iia) an oxidation oven, wherein, during use, the oxidation oven has an internal temperature of between about 180 degrees Celsius (° C.) and about 400° C. and an oxidizing atmosphere, and (iib) one or more carbonization furnaces, wherein, during use, each carbonization furnace is heated to a temperature of between about 1000° C. and about 3000° C. (e.g., about 1000, 1250, 1500, 1750, 2000, 2250, 2500, 2750, or about 3000° C.). In some embodiments, carbonization processing stage (ii) comprises at least two carbonization furnaces, wherein each of the at least two carbonization furnaces, during use, is heated to a different temperature between about 1000° C. and about 3000° C. In some embodiments, the oxidizing atmosphere comprises oxygen or nitrogen dioxide. In some embodiments, each carbonization furnace comprises an inert atmosphere (e.g., argon or nitrogen gas).

In some embodiments, surface treatment stage (iii) comprises a bath containing a surface treatment solution. In some embodiments, the surface treatment solution is an aqueous solution. In some embodiments, the surface treatment solution is an electrolyte solution (e.g., an aqueous solution comprising of ammonium bicarbonate or sodium hypochlorite). In some embodiments, surface treatment stage (iii) further comprises one or more rollers to direct carbon fiber from carbonization processing stage (ii) into the bath.

In some embodiments, the system further comprises a sizing bath comprising a solution or emulsion (e.g., an aqueous solution or emulsion) of one or more sizing agent to apply the one or more sizing agent to the carbon fiber (e.g., to increase interaction of the carbon fiber with polymeric resin and/or to modify the properties of the CFRP intermediate). The sizing bath can be located between surface treatment stage (iii) and the one or more impregnation dies (iv). In some embodiments, the one or more sizing agent is a polymeric resin, such as, but not limited to epoxy and polyester resins, polyurethane resins, acrylic resins, polyvinyl alcohol (PVA), polyethylene oxide (PEO), ethylene oxide or propylene oxide copolymers, polyvinylpyrrolidone, dicyanformaldehyde resin, gelatin, etc. In some embodiments, sizing bath further comprises one or more rollers to direct carbon fiber from carbonization processing stage (ii) into the bath.

In some embodiments, the system further comprises a drying stage positioned between surface treatment stage (iii) and the one or more impregnation dies (iv) (e.g., between a sizing bath positioned after the surface treatment stage (iii) in the direction of fiber flow in the system and prior to the one or more impregnation dies (iv). In some embodiments, the drying stage comprises a drying oven through which carbon fiber can be pulled. In some embodiments, the drying oven can be a drying oven present in an exist carbon fiber manufacturing line. The drying oven can be heated to a temperature and/or have a length sufficient to remove water from the carbon fiber. In some embodiments, the drying oven can be heated to an internal temperature of about 200° C. or less (e.g., about 150° C. or less or about 120° C. or less). In some embodiments, the drying oven can be heated using heat from a carbonization furnace that is present in the carbonization processing stage. In some embodiments, the drying stage can comprise a heated, polished bar or series of bars over which carbon fiber can be pulled.

In some embodiments, the system further comprises (in addition to or as an alternative to the drying stage) a heating stage. The heating stage is used to heat the carbon fiber to a temperature corresponding to a melt temperature of the polymer resin corresponding to the thermoplastic or thermosetting polymeric matrix of the CFRP intermediate product. The heating stage is positioned between surface treatment stage (iii) and the one or more impregnation dies (iv). In some embodiments, the heating stage is positioned directly between surface treatment stage (iii) and the one or more impregnation dies (iv). In some embodiments, the heating stage is positioned between a sizing bath and the one or more impregnation dies (iv). In some embodiments, the heating stage is positioned between a drying stage and the one or more impregnation dies (iv). In some embodiments, the heating stage comprises an oven capable of heating carbon fiber to a desired polymer resin melt temperature and through which the carbon fiber can be pulled. In some embodiments, the heating stage comprises one or more heated pins, wherein each of said one or more heated pins is located just prior to an inlet of one of the one or more impregnation dies in a direction of fiber movement in the system.

In some embodiments, the system further comprises a spreader bar to spread carbon fiber tows prior to entry of the carbon fiber tows into the one or more impregnation dies (iv). In some embodiments, the system further comprises a tensioning roll prior to the one or more impregnation dies (iv).

Each of the one or more impregnation dies can comprises a least one channel or slot through which carbon fiber can be pulled and that is in fluid communication with an inlet for polymeric resin. The resin can be introduced into the inlet via injection or extrusion. In some embodiments, each of the one or more impregnation dies further comprises a polymer resin feed tube and/or a polymer extruder. In some embodiments, the system further comprises one or more exit dies or impregnation bars positioned after the exit from the one or more impregnation dies to increase wet out of the polymeric resin in the carbon fiber. The exit die can comprise one or more rollers or pins, some of which can be vertically adjustable to change the brake angle of fiber being pulled through the exit die. In some embodiments, one or more of the impregnation dies and/or exit dies (and/or the rollers or pins thereof) are heated.

Cooling stage (v) can comprise one or more components to cool and/or shape the impregnated carbon fiber. In some embodiments, cooling stage (v) comprises a shaping die for forming a rod-shaped material from impregnated carbon fiber. The shaping die can be selected to have an exit of channel with a desired cross-sectional shape (e.g., a circle of a desired circumference, an oval, a triangle, a square, a rectangle, an irregular shape or any other desired shape). In some embodiments, the cooling stage can comprise a two opposing surfaces (e.g., a caliper-type device) which can be used to bunch the sides of the impregnated carbon fiber. In some embodiments, cooling stage (v) comprises a series of at least two free-turning rollers through which impregnated carbon fiber can be pulled (e.g., to maintain the impregnated carbon fiber in a flat or ribbon shape and/or to enhance the surface smoothness of the impregnated carbon fiber). In some embodiments, cooling stage (v) comprises one or more jet or air hose for directing cooled air or cooled water toward an impregnated carbon fiber. In some embodiments, cooling stage (v) comprises a chamber (e.g., a box) through which impregnated carbon fiber can be pulled, wherein the chamber comprises an inlet for cooled air, an inlet for impregnated carbon fiber, and an outlet for cooled, impregnated carbon fiber. In some embodiments, the one or more jet or air hose or the chamber is positioned after any shaping element (e.g., a shaping die, a pair of opposing surfaces or a set of free-turning rollers) in the direction of movement of the impregnated carbon fiber.

In some embodiments, the system further comprises a puller, positioned between cooling stage (v) and product processing stage (vi) through which cooled, impregnated carbon fiber is pulled after it exits cooling stage (v). The puller can be, for example, a set of power-driven rollers, which can be set to pull the fiber through the system at a desired speed.

The components of product processing stage (vi) can vary depending upon the desired CFRP intermediated product. In some embodiments, when a continuous product is desired, product processing stage (vi) can comprise a winder. In some embodiments, when a discontinuous CFRP intermediate product is desired, product processing stage (vi) comprises a chopper and/or a pelletizer. Product processing stage (vi) can also include other components for packaging the discontinuous products in to bags or boxes.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

CFRP Intermediates with PP and PA6

Figure 5A:
FIG. 5A is a scanning electron microscope (SEM) image of a cross section of a 50,000 filament carbon fiber tow impregnated with polypropylene (PP) prepared according to a process of the presently disclosed subject matter. The image was taken at 500 times magnification. The scale bar in the lower left-hand corner represents 100 micrometers (μm).
Figure 5B:
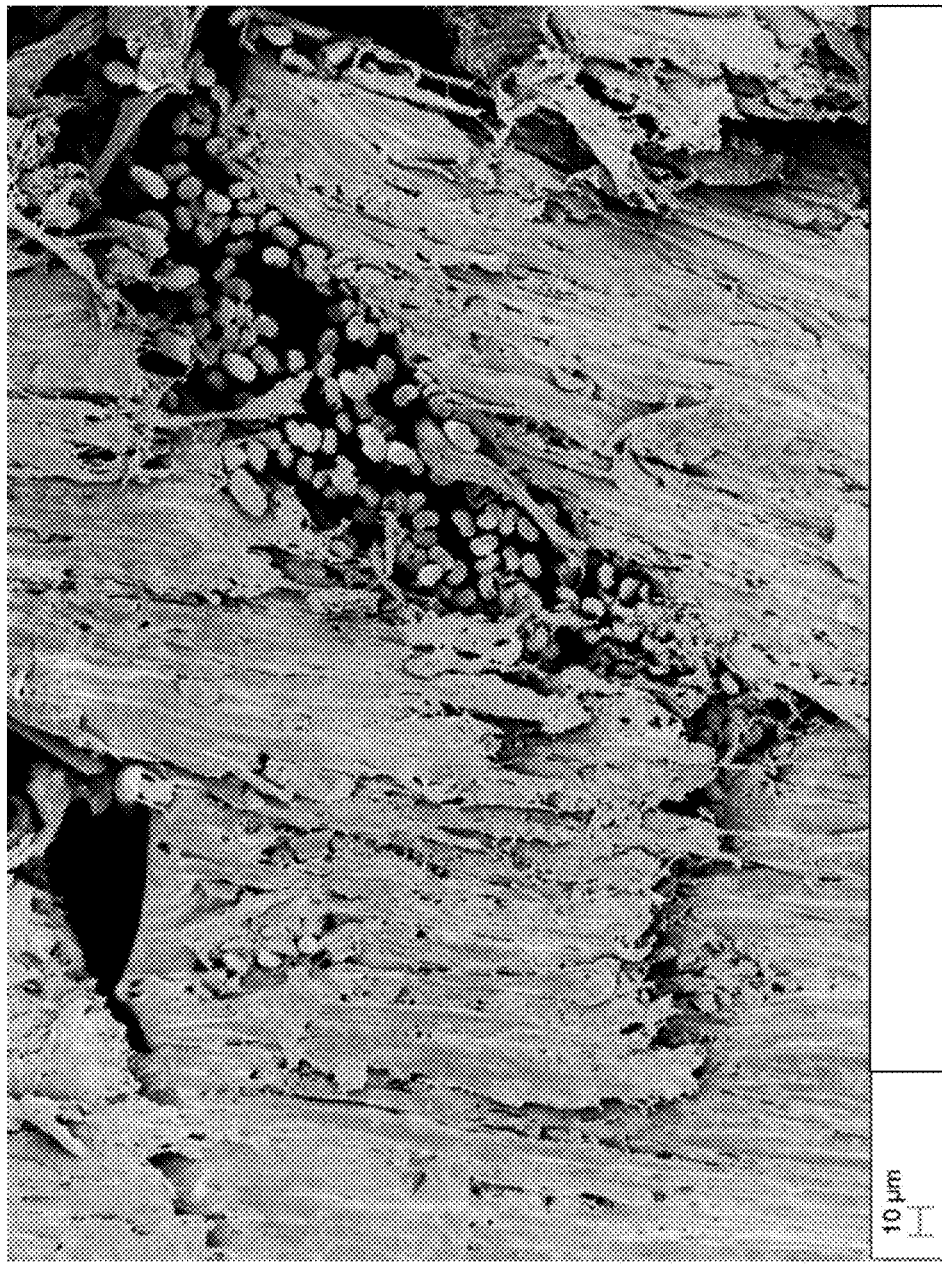
FIG. 5B is a scanning electron microscope (SEM) image of a cross section of a 50,000 filament carbon fiber tow impregnated with polypropylene (PP) prepared according to a process of the presently disclosed subject matter. The image was taken at 2,000 times magnification. The scale bar in the lower left-hand corner represents 10 micrometers (μm).
Figure 6:
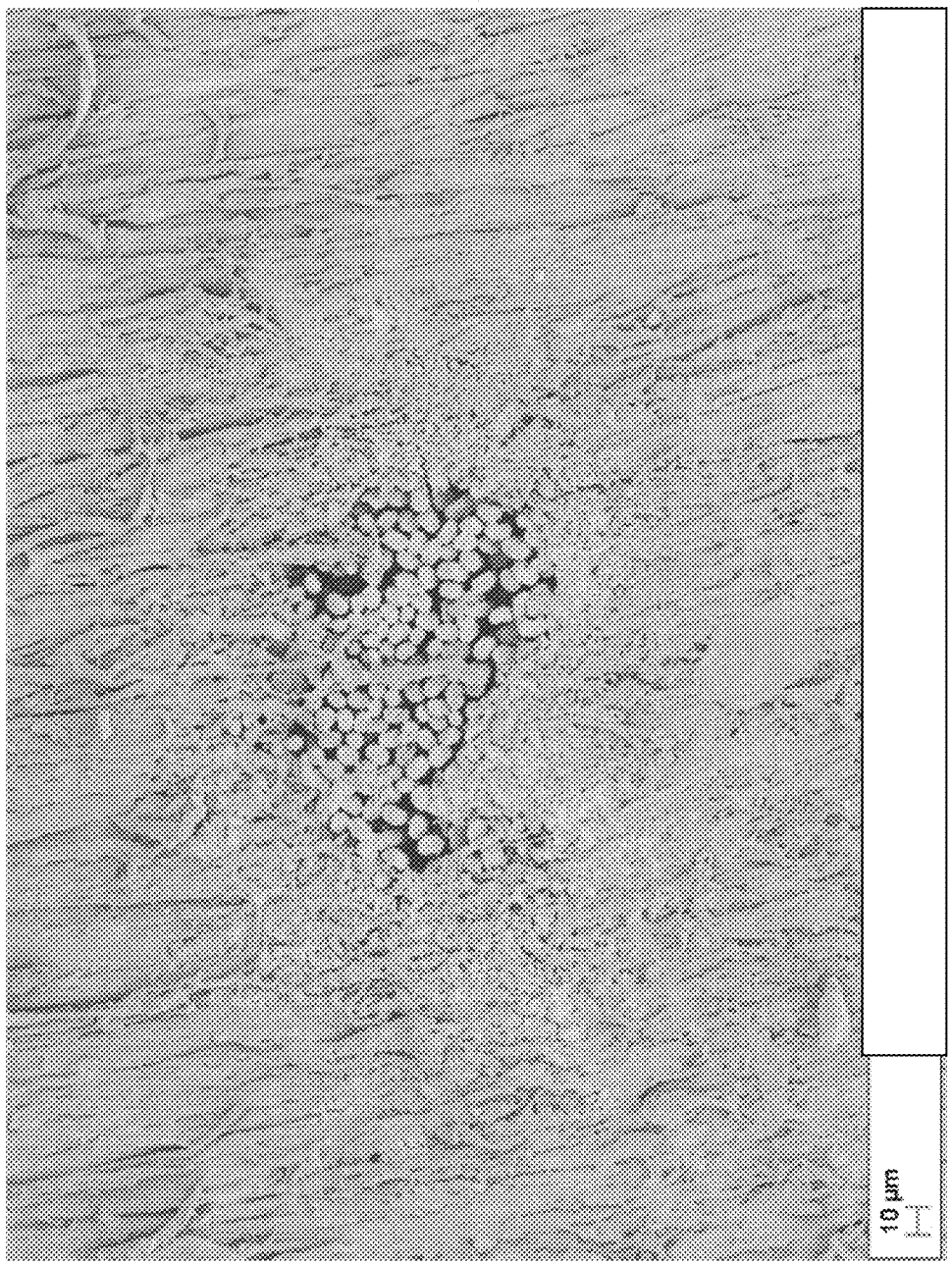
FIG. 6 is a scanning electron microscope (SEM) image of a cross section of a 50,000 filament carbon fiber tow impregnated with polyamide 66 (PA66) prepared according to a process of the presently disclosed subject matter. The image was taken at 2,000 times magnification. The scale bar in the lower left-hand corner represents 10 micrometers (μm).

CFRP intermediates were prepared from carbon fiber using a system similar to that shown in FIGS. 4A-4C as a proof of concept for preparing CFRP intermediates at typical carbon fiber manufacturing line speeds. The CFRP intermediates were prepared from commercially available carbon fiber comprising 50,000 filament tows (50K Zoltek Panex 35, Zoltek Corporation, Bridgeton, Missouri, United States of America). The carbon fiber was impregnated with polypropylene (PP) resin (35 melt flow index (MFI) homopolymer, from Sabic, Riyadh, Saudi Arabia) or polyamide 66 (PA66, also known as nylon 66, from RadiciGroup, Grandino, Italy). SEM images of cross-sections of a carbon fiber bundle impregnated with PP are shown in FIGS. 5A and 5B. A SEM image of a cross-section of a carbon fiber bundle impregnated with PA66 is shown in FIG. 6.

For trials involving impregnation with PP, the impregnation die was heated to 230° C. and the extruder temperature profile was 230° C., 220° C., 230° C. (for the temperature of the feeding zone, melting zone and metering zone, respectively). Other conditions were varied as shown in Table 1, below, including the temperature of the heated roller located just prior to the impregnation die, the extruder speed, the pressure of the cooled air used in the cooling chamber, and the take-up speed of the impregnated fiber. The wt % of fiber in the resulting impregnated fiber for each of Trials 2-9 is also shown in Table 1. For the PP impregnation trials, the carbon fiber input into the impregnation die had a width of about 0.38 inches, and the impregnated carbon fiber had a width of about 0.8 inches.

TABLE 1

Conditions and Results for PP Impregnation of Carbon Fiber.

| Trial | Heated Roller Temp. (° C.) | Extruder Speed (mm/min) | Cooling air (Psi) | Take-up Speed (feet/min) | Fiber Weight (wt % of impregnated fiber) |
|---|---|---|---|---|---|
| 1 | n/a | 2500 | 25 | n/a | ND |
| 2 | 110 | 3500 | 25 | n/a | 20 |
| 3 | 246 | 4200 | 25 | 3 | 36 |
| 4 | 246 | 4200 | 25 | 3 | 26 |
| 5 | 300 | 4200 | 50 | 3 | 25 |
| 6 | 265 | 8400 | 95 | 6 | 36 |
| 7 | 265 | 8400 | 95 | 6 | 30 |
| 8 | 265 | 8400 | 95 | 6 | 35 |
| 9 | 265 | 8400 | 95 | 6 | 28 |

ND = not determined

For trials involving impregnation with PA66, the extruder speed was 4200 mm/min, the cooling air pressure was 95 psi, and the take-up speed was 3 feet/min. Carbon fiber width prior to impregnation was 0.59 inches. After impregnation, the impregnated carbon fiber width was 0.79 inches for trial 1 and 0.8 inches for trial 2. Other conditions were varied as shown in Table 2, below.

TABLE 2

Conditions and Results for PA6 Impregnation of Carbon Fiber.

| Trial | Heated Roller Temp. (° C.) | Extruder Temp. Profile (° C.) | Impregnation Die Temp. (° C.) | Fiber Weight (wt % of impregnated fiber) |
|---|---|---|---|---|
| 1 | 200 | 270, 280, 285 | 285 | 18.9 |
| 2 | 266 | 280, 290, 295 | 295 | ND |

ND = not determined

Example 2

Additional CFRP Intermediates with PP

Additional CFRP intermediates were prepared from carbon fiber using a system similar to that shown in FIGS. 4A, except where a five pin exit die was added after the extrusion die, as shown in FIG. 7A, to provide additional fiber wet out. The pins of the exit die were housed with cartridge heaters (100 W each, 120 V), connected to a relay/controller. In addition, a pulley was added at the feed end of the impregnation die.

Figure 8A:
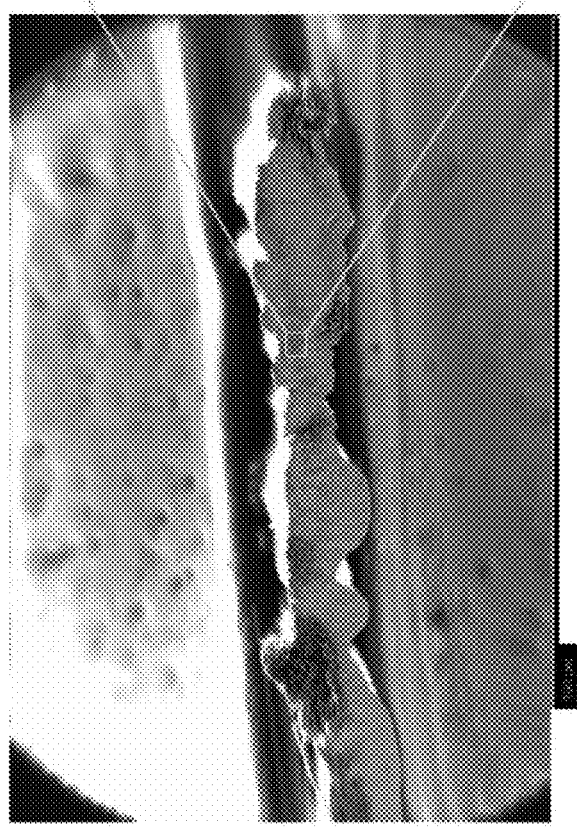
FIG. 8A is a scanning electron microscope (SEM) image of a cross section of a 24,000 filament carbon fiber tow impregnated with polypropylene according to a process of the presently disclosed subject matter at a process speed of 8 feet per minute. The image was taken at 56 times magnification. The scale bar in the lower left-hand corner represents 100 micrometers (μm).
Figure 8B:
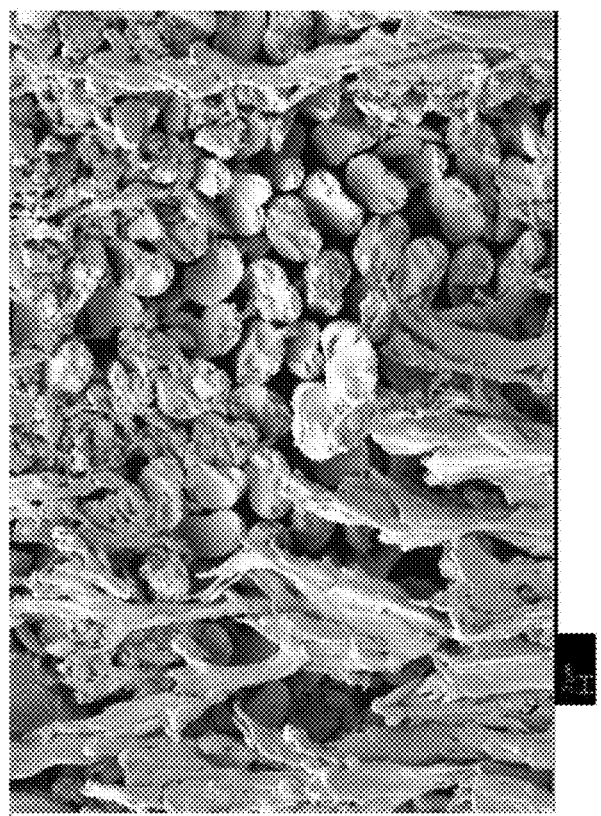
FIG. 8B is a scanning electron microscope (SEM) image of a further magnified portion of the carbon fiber tow impregnated with polypropylene shown in FIG. 8A. The image was taken 3,000 times magnification of the area in FIG. 8A outlined in the square. The scale bar in the lower left-hand corner represents 2 micrometers (μm).
Figure 9B:
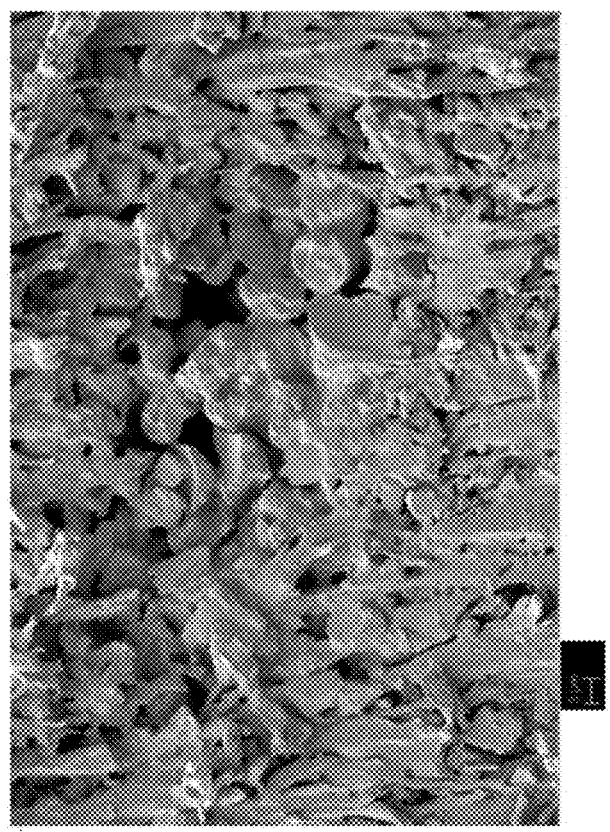
FIG. 9B is a scanning electron microscope (SEM) image of a further magnified portion of the carbon fiber tow impregnated with polypropylene shown in FIG. 9A. The image was taken 3,000 times magnification of the area in FIG. 9A outlined in the square. The scale bar in the lower left-hand corner represents 3 micrometers (μm).
Figure 9A:
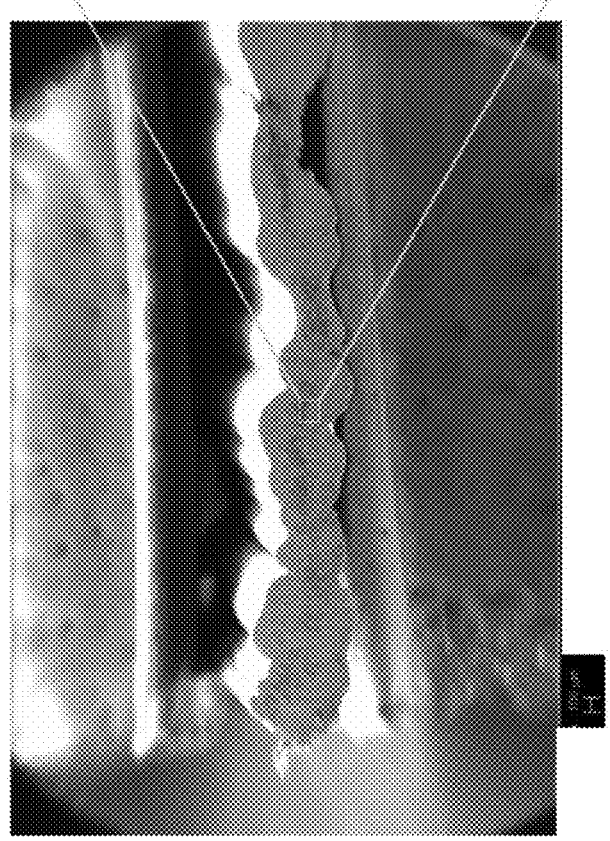
FIG. 9A is a scanning electron microscope (SEM) image of a cross section of a 24,000 filament carbon fiber tow impregnated with polypropylene according to a process of the presently disclosed subject matter at a process speed of 12 feet per minute. The image was taken at 54 times magnification. The scale bar in the lower left-hand corner represents 100 micrometers (μm).

The CFRP intermediates were prepared from commercially available carbon fiber comprising 24,000 filament tows (Tokyo, Japan). The carbon fiber was impregnated with a resin mixture comprising 60 weight % polypropylene (PP) resin (35 MFI homopolymer) and 40 weight % of a flow enhancer (Proflow 1000, Polyvisions Inc., Manchester, Pennsylvania, United States of America). For trials with the resin mixture, the input roller temperature was set to 265° C. and the extruder temperature to 270° C. Both dies were heated to 285° C. The air flow pressure in the cooling stage box was set to 95 psi. Additional trial conditions and results are provided in Table 3, below. SEM images of samples prepared at a take-up speed of 8 feet/min are shown in FIGS. 8A and 8B. SEM images of samples prepared at a take-up speed of 12 feet/min are shown in FIGS. 9A and 9B. Sixty feet of fiber was run continuously to assess consistency of the line and repeatability.

Commercial CFRP intermediate products typically have about 90% to about 95% impregnation (i.e., at least 90% of the filaments in a fiber tow are coated by the polymeric resin). In comparing FIGS. 8A and 8B with FIGS. 9A and 9B, it can be observed that, for these examples, the use of the higher take up speed appeared to enhance wet out, resulting in fewer areas of incomplete impregnation and more thorough coating of individual filaments. Visual inspection of the SEM images of the impregnated fiber samples, particularly those prepared with the higher take up speed, suggests that they approached or matched the level of impregnation typically found in commercial CFRP intermediate products. Additional optimization of the resin mixture MFI, extruder temperature, pre-impregnation fiber heating, fiber surface treatment and/or sizing, and impregnation die and/or exit die configuration can be expected to enhance impregnation further.

TABLE 3

Additional Conditions and Results for PP Impregnation of Carbon Fiber.

| Trial | Extruder Speed (mm/min) | Take Up Speed (ft/min) | Fiber Weight (wt % of impregnated fiber) |
|---|---|---|---|
| 1 | 4700 | 8 | 33.33 |
| 2 | 4700 | 8 | 34.94 |
| 3 | 4700 | 13 | 44.92 |
| 4 | 5000 | 12 | 41 |
| 5 | 5200 | 12 | 42 |
| 6 | 5000 | 12 | 41 |

In addition, impregnated fiber tow samples (fiber weight 30.84%) were prepared at a take up speed of 12 feet per minute and bunched up after leaving the exit die by manually pressing the sides of the impregnated fiber tow to produce a continuous product with a rod shape. Exemplary rod diameters were 1.6 mm, 1.74 mm, and 2.5 mm.

Example 3

Composite Plates of CFRP Intermediates

To confirm the processability of the CFRP intermediates prepared according to the presently disclosed subject matter, polypropylene impregnated carbon fiber tapes were prepared as described in Example 2, except using one of two different resin mixtures, a first resin mixture comprising 80 weight % polypropylene (PP) resin (35 MFI homopolymer) and 20 weight % of a flow enhancer (Proflow 1000, Polyvisions Inc., Manchester, Pennsylvania, United States of America); and a second resin mixture comprising 60 weight % polypropylene (PP) resin (35 MFI homopolymer) and 40 weight % of a flow enhancer (Proflow 1000, Polyvisions Inc., Manchester, Pennsylvania, United States of America). A first CFRP intermediate tape was prepared using the first resin mixture at an extruder speed of 4200 mm/min and a take-up speed of 8 feet/min. The tape was cut into six-inch layer pieces and welded using thermoplastic welding in stacks of 5. The welded, 5-layer stacks were placed in a mold and a consolidated composite panel was prepared by applying a pressure of 5 tons at 170° C. for 15 minutes. The mechanical properties of 5 specimens of the panel (Panel 1) were tested according to standard methods known in the art. The average flex strength of the specimens was 170 megapascal (MPa), with a standard deviation of 48.10 MPa. The average flex modulus was 24.57 gigapascal (GPa), with a standard deviation of 4.24 GPa. Additional physical and mechanical properties are shown below in Table 4. The total number of layers in the composite panel was 180.

TABLE 4

Properties of Composite Panel 1.

| Specimen | Width (mm) | Thickness (mm) | Peak Load (N) | Flex Strength (MPa) | Slope (N/mm) | Flex Modulus (GPa) |
|---|---|---|---|---|---|---|
| 1 | 13.19 | 4.62 | 349 | 133.8 | 256 | 18.40 |
| 2 | 12.49 | 4.43 | 457 | 201.8 | 349 | 30.04 |
| 3 | 13.07 | 4.53 | 481 | 193.2 | 312 | 23.87 |
| 4 | 13.32 | 4.45 | 385 | 157.5 | 305 | 24.16 |
| 5 | 13.20 | 4.47 | 407 | 166.6 | 334 | 26.38 |

A second CFRP intermediate tape was prepared using the second resin mixture at an extruder speed of 4700 mm/min and a take-up speed of 8 feet/min. As for Panel 1, the second tape was cut into six-inch layer pieces and welded using thermoplastic welding in stacks of 5. The welded, 5-layer stacks were placed in a mold and a consolidated composite panel was prepared by applying a pressure of 5 tons at 170° C. for 15 minutes. The mechanical properties of 5 specimens of the panel (Panel 2) were tested according to standard methods known in the art. The average flex strength of the specimens was 197.58 MPa, with a standard deviation of 6.31 MPa. The average flex modulus was 23.02 GPa, with a standard deviation of 1.37 GPa. Additional physical and mechanical properties are shown below in Table 5. The total number of layers in the composite panel was 180.

TABLE 5

Properties of Composite Panel 2.

| Specimen | Width (mm) | Thickness (mm) | Peak Load (N) | Flex Strength (MPa) | Slope (N/mm) | Flex Modulus (GPa) |
| --- | --- | --- | --- | --- | --- | --- |
| 1 | 10.93 | 4.35 | 394 | 200.0 | 225 | 21.49 |
| 2 | 13.06 | 4.29 | 438 | 191.1 | 267 | 22.14 |
| 3 | 11.97 | 4.34 | 436 | 203.4 | 257 | 22.54 |
| 4 | 11.85 | 4.32 | 425 | 201.5 | 272 | 24.38 |
| 5 | 12.36 | 4.37 | 431 | 192.0 | 294 | 24.53 |

A third CFRP intermediate tape was prepared using the second resin mixture at an extruder speed of 5000 mm/min and a take-up speed of 12 feet/min. As for Panels 1 and 2, the third tape was cut into six-inch layer pieces and welded using thermoplastic welding in stacks of 5. The welded, 5-layer stacks were placed in a mold and a consolidated composite panel was prepared by applying a pressure of 5 tons at 170° C. for 15 minutes. The mechanical properties of 3 specimens of the panel (Panel 3) were tested according to standard methods known in the art. The average flex strength of the specimens was 262.51 MPa, with a standard deviation of 28.67 MPa. The average flex modulus was 33.57 GPa, with a standard deviation of 11.81 GPa. Additional physical and mechanical properties are shown below in Table 6. The total number of layers in the composite panel was 72.

TABLE 6

Properties of Composite Panel 3.

| Specimen | Width (mm) | Thickness (mm) | Peak Load (N) | Flex Strength (MPa) | Slope (N/mm) | Flex Modulus (GPa) |
| --- | --- | --- | --- | --- | --- | --- |
| 1 | 13.57 | 1.15 | 62 | 260.6 | 30 | 46.06 |
| 2 | 12.14 | 1.13 | 61 | 292.1 | 18 | 32.06 |
| 3 | 12.39 | 1.21 | 57 | 234.8 | 16 | 22.58 |

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for preparing a carbon fiber reinforced polymer (CFRP) intermediate product from a carbon fiber precursor, wherein the CFRP intermediate product comprises carbon fiber and a thermoplastic or thermosetting polymeric matrix, the system comprising:
   (i) a carbon fiber precursor feed roll;
   (ii) a carbonization processing stage comprising one or more ovens and/or furnaces, positioned to receive carbon fiber precursor fiber form the carbon fiber precursor feed roll and wherein the carbon fiber precursor fiber is carbonized to form carbon fiber;
   (iii) a surface treatment stage comprising a bath or other treatment chamber, positioned to receive carbon fiber from the carbonization processing stage, wherein carbon fiber is cleaned and/or oxidized and/or etched;
   (iv) one or more impregnation dies for impregnating the carbon fiber with a polymer resin corresponding to the thermoplastic or thermosetting polymeric matrix of the CFRP intermediate product, wherein the one or more impregnation dies are positioned to receive the carbon fiber after the surface treatment stage;
   (v) a cooling stage, positioned to receive impregnated carbon fiber after the impregnated carbon fiber exits the one or more impregnation dies, and wherein the impregnated carbon fiber is cooled; and
   (vi) a product processing stage positioned to receive cooled, impregnated carbon fiber after it exits the cooling stage and wherein the cooled, impregnated carbon fiber is processed into a desired form of the CFRP intermediate product;
   wherein (i)-(vi) are configured as a single or integrated production line, and the system further comprises one or more tensioning roll.

2. The system of claim 1, wherein carbonization processing stage (ii) comprises (iia) an oxidation oven, wherein, during use, the oxidation oven has an internal temperature of between about 180 degrees Celsius (° C.) and about 400° C. and an oxidizing atmosphere, and (iib) one or more carbonization furnaces, wherein, during use, each carbonization furnace is heated to a temperature of between about 1000° C. and about 3000° C.

3. The system of claim 2, wherein the oxidizing atmosphere comprises oxygen or nitrogen dioxide.

4. The system of claim 1, wherein surface treatment stage (iii) comprises a bath containing an electrolyte solution.

5. The system of claim 1, wherein the system further comprises a sizing bath comprising a bath comprising a solution or emulsion of one or more sizing agent, for applying one or more sizing agent to carbon fiber, wherein the sizing bath is positioned between the surface treatment stage (iii) and the one or more impregnation dies (iv).

6. The system of claim 1, wherein the system further comprises a drying stage comprising a drying oven through which carbon fiber can be pulled or a heated polished bar over which carbon fiber can be pulled, wherein the drying stage is positioned between surface treatment stage (iii) and the one or more impregnation dies (iv).

7. The system of claim 1, wherein the system further comprises a heating stage for heating the carbon fiber to a temperature corresponding to a melt temperature of the polymer resin corresponding to the thermoplastic or thermosetting polymeric matrix of the CFRP intermediate product, positioned between surface treatment stage (iii) and the one or more impregnation dies (iv).

8. The system of claim 7, wherein the heating stage comprises one or more heated pins, wherein each of said one or more heated pins is located just prior to an inlet of one of the one or more impregnation dies in a direction of fiber movement in the system.

9. A system for preparing a carbon fiber reinforced polymer (CFRP) intermediate product from a carbon fiber precursor, wherein the CFRP intermediate product comprises carbon fiber and a thermoplastic or thermosetting polymeric matrix, the system comprising:

(i) a carbon fiber precursor feed roll;
(ii) a carbonization processing stage comprising one or more ovens and/or furnaces, positioned to receive carbon fiber precursor fiber from the carbon fiber precursor feed roll and wherein the carbon fiber precursor fiber is carbonized to form carbon fiber;
(iii) a surface treatment stage comprising a bath or other treatment chamber, positioned to receive carbon fiber from the carbonization processing stage, wherein carbon fiber is cleaned and/or oxidized and/or etched;
(iv) one or more impregnation dies for impregnating the carbon fiber with a polymer resin corresponding to the thermoplastic or thermosetting polymeric matrix of the CFRP intermediate product, wherein the one or more impregnation dies are positioned to receive the carbon fiber after the surface treatment stage;
(v) a cooling stage, positioned to receive impregnated carbon fiber after the impregnated carbon fiber exits the one or more impregnation dies, and wherein the impregnated carbon fiber is cooled; and
(vi) a product processing stage positioned to receive cooled, impregnated carbon fiber after it exits the cooling stage and wherein the cooled, impregnated carbon fiber is processed into a desired form of the CFRP intermediate product; wherein the system further comprises a spreader bar to spread carbon fiber tows prior to entry into the one or more impregnation dies (iv).

10. The system of claim 1, wherein each of the one or more impregnation dies further comprises a polymer resin feed tube or a polymer extruder.

11. The system of claim 1, wherein cooling stage (v) comprises a shaping die for forming a rod-shaped material from impregnated carbon fiber.

12. A system for preparing a carbon fiber reinforced polymer (CFRP) intermediate product from a carbon fiber precursor, wherein the CFRP intermediate product comprises carbon fiber and a thermoplastic or thermosetting polymeric matrix, the system comprising:
(i) a carbon fiber precursor feed roll;
(ii) a carbonization processing stage comprising one or more ovens and/or furnaces, positioned to receive carbon fiber precursor fiber from the carbon fiber precursor feed roll and wherein the carbon fiber precursor fiber is carbonized to form carbon fiber;
(iii) a surface treatment stage comprising a bath or other treatment chamber, positioned to receive carbon fiber from the carbonization processing stage, wherein carbon fiber is cleaned and/or oxidized and/or etched;
(iv) one or more impregnation dies for impregnating the carbon fiber with a polymer resin corresponding to the thermoplastic or thermosetting polymeric matrix of the CFRP intermediate product, wherein the one or more impregnation dies are positioned to receive the carbon fiber after the surface treatment stage;
(v) a cooling stage, positioned to receive impregnated carbon fiber after the impregnated carbon fiber exits the one or more impregnation dies, and wherein the impregnated carbon fiber is cooled, wherein cooling stage (v) comprises a series of at least two free-turning rollers through which impregnated carbon fiber can be pulled; and
(vi) a product processing stage positioned to receive cooled, impregnated carbon fiber after it exits the cooling stage and wherein the cooled, impregnated carbon fiber is processed into a desired form of the CFRP intermediate product.

13. The system of claim 1, wherein cooling stage (v) comprises one or more jet for directing cooled air or cooled water toward an impregnated carbon fiber after an exit of one of the one or more impregnation dies.

14. The system of claim 1, wherein cooling stage (v) comprises a chamber through which impregnated carbon fiber can be pulled, wherein the chamber comprises an inlet for cooled air, an inlet for impregnated carbon fiber, and an outlet for cooled, impregnated carbon fiber.

15. The system of claim 1, wherein the system further comprises a puller positioned between cooling stage (v) and product processing stage (vi) through which cooled, impregnated carbon fiber is pulled after it exits cooling stage (v).

16. The system of claim 1, wherein product processing stage (vi) comprises a winder.

17. The system of claim 1, wherein product processing stage (vi) comprises a chopper and/or a pelletizer.

* * * * *